US012018926B2

(12) United States Patent
Motoyama et al.

(10) Patent No.: US 12,018,926 B2
(45) Date of Patent: Jun. 25, 2024

(54) CONTROLLER AND CONTROL METHOD

(71) Applicant: SONY GROUP CORPORATION, Tokyo (JP)

(72) Inventors: Takuto Motoyama, Tokyo (JP); Masaki Handa, Tokyo (JP); Shinichiro Abe, Tokyo (JP); Masahiko Toyoshi, Tokyo (JP); Shun Lee, Tokyo (JP); Kenichiro Oi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 391 days.

(21) Appl. No.: 17/299,400

(22) PCT Filed: Dec. 3, 2019

(86) PCT No.: PCT/JP2019/047138
§ 371 (c)(1),
(2) Date: Jun. 3, 2021

(87) PCT Pub. No.: WO2020/121882
PCT Pub. Date: Jun. 18, 2020

(65) Prior Publication Data
US 2022/0049946 A1 Feb. 17, 2022

(30) Foreign Application Priority Data
Dec. 13, 2018 (JP) .................. 2018-233562

(51) Int. Cl.
G01B 11/02 (2006.01)
B64C 39/02 (2023.01)
(Continued)

(52) U.S. Cl.
CPC .......... *G01B 11/026* (2013.01); *B64C 39/024* (2013.01); *G06T 7/85* (2017.01);
(Continued)

(58) Field of Classification Search
CPC ......... H04N 23/695; H04N 23/54; G06T 7/85
See application file for complete search history.

(56) References Cited

U.S. PATENT DOCUMENTS

2015/0329048 A1* 11/2015 Wang .................... B60R 1/00
348/148
2017/0195564 A1* 7/2017 Appia ................... G06T 15/205
(Continued)

FOREIGN PATENT DOCUMENTS

CN 103424959 A 12/2013
CN 106030431 A 10/2016
(Continued)

OTHER PUBLICATIONS

International Search Report and Written Opinion of PCT Application No. PCT/JP2019/047138, dated Feb. 18, 2020, 12 pages of ISRWO.

Primary Examiner — David Perlman
(74) Attorney, Agent, or Firm — CHIP LAW GROUP

(57) ABSTRACT

A controller includes an acquisition unit that acquires image data captured by an imaging device for photographing disposed in a moving body, and a calculation unit that calculates a relative position of a position of a subject, which is detected by a plurality of distance-measuring imaging devices provided in the moving body, based on the subject included in the image data.

12 Claims, 20 Drawing Sheets

(51) Int. Cl.
  *B64U 101/30*    (2023.01)
  *G06T 7/80*     (2017.01)
  *H04N 23/54*    (2023.01)
  *H04N 23/695*   (2023.01)

(52) U.S. Cl.
  CPC ........... *H04N 23/54* (2023.01); *H04N 23/695* (2023.01); *B64U 2101/30* (2023.01)

(56) References Cited

U.S. PATENT DOCUMENTS

| | | | |
|---|---|---|---|
| 2017/0301111 A1* | 10/2017 | Zhao | H04N 17/002 |
| 2018/0077403 A1 | 3/2018 | Onomura | |
| 2018/0108150 A1* | 4/2018 | Curtis | H04N 13/246 |
| 2018/0316912 A1 | 11/2018 | Wakai | |
| 2019/0329903 A1* | 10/2019 | Thompson | B64D 47/08 |
| 2019/0377345 A1* | 12/2019 | Bachrach | G05D 1/0088 |

FOREIGN PATENT DOCUMENTS

| | | | |
|---|---|---|---|
| JP | 2007-114916 A | 5/2007 | |
| JP | 2007181129 A | 7/2007 | |
| JP | 2012-075060 A | 4/2012 | |
| JP | 5369873 B2 | 12/2013 | |
| JP | 2016-082441 A | 5/2016 | |
| JP | 2017-501915 A | 1/2017 | |
| JP | 2018004420 A | 1/2018 | |
| WO | WO-2010119496 A1 | 10/2010 | |
| WO | 2015/015542 A1 | 2/2015 | |
| WO | 2017/149813 A1 | 9/2017 | |

* cited by examiner

FIG.5
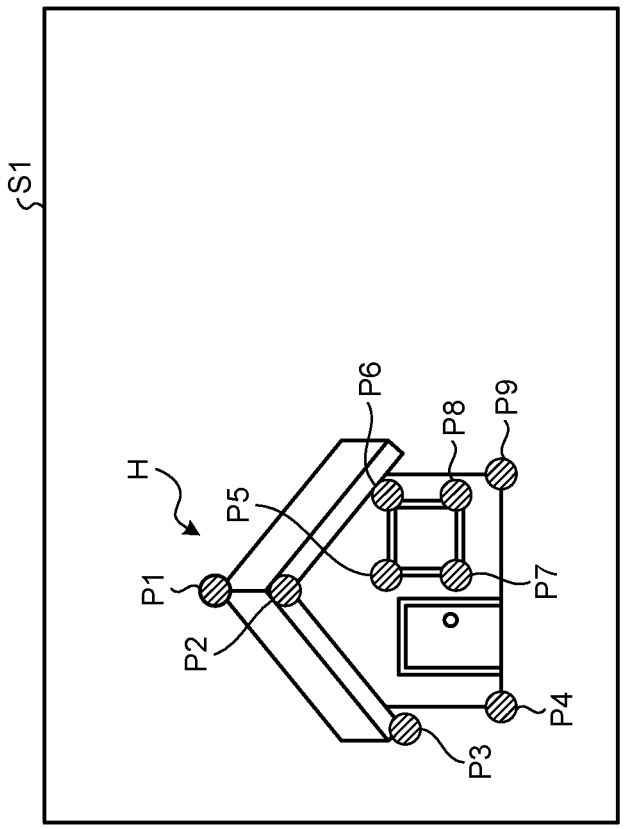
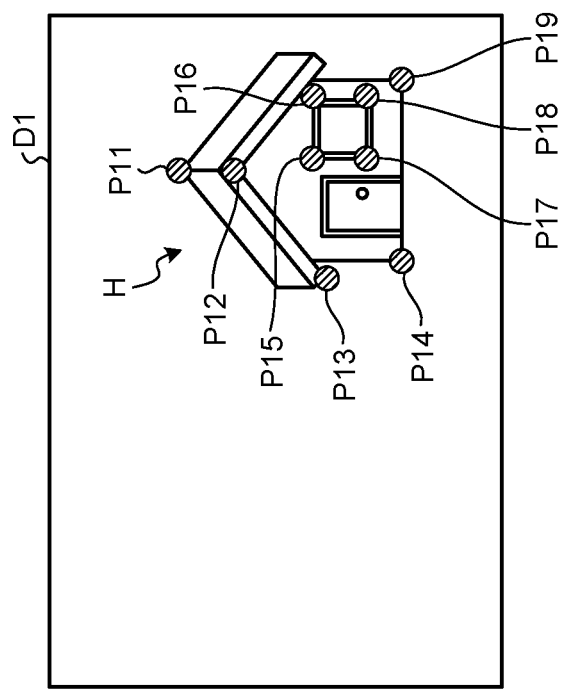

FIG.8
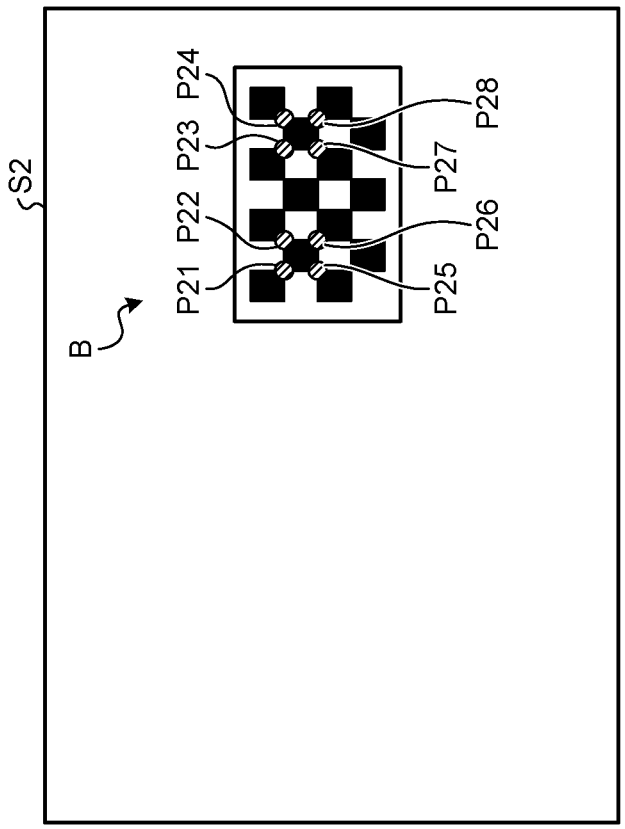
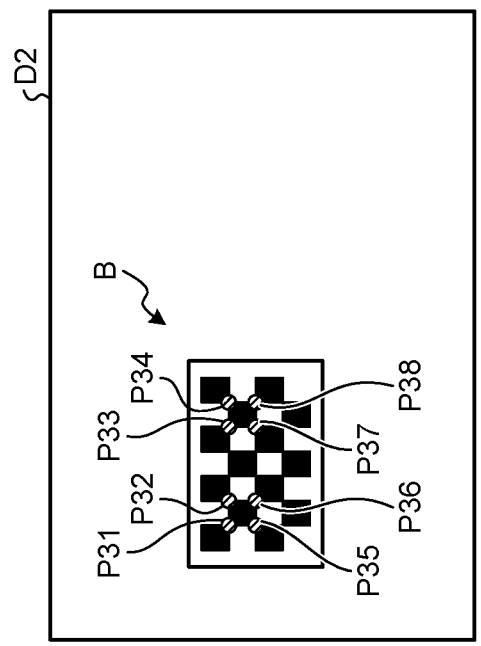

FIG.9
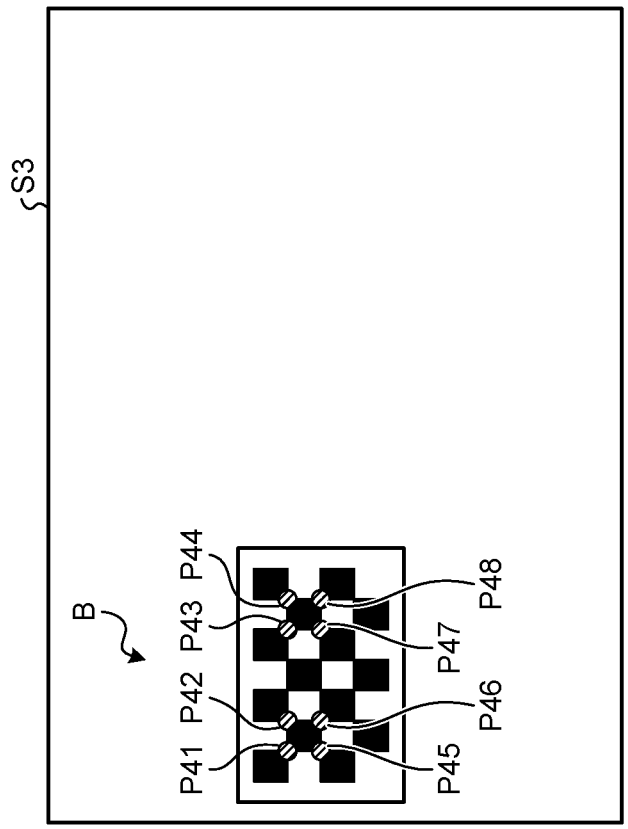
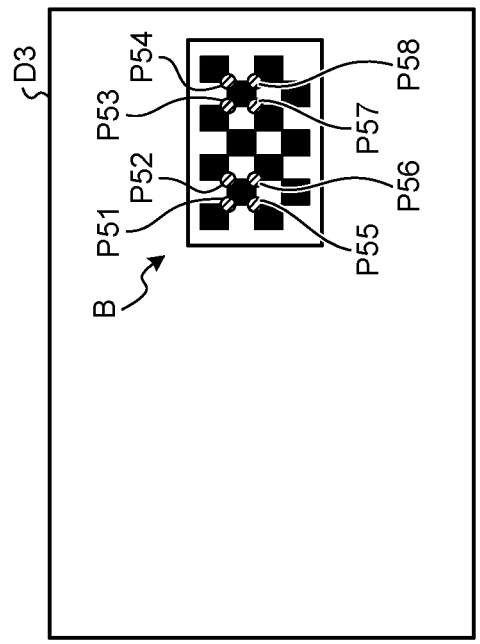

FIG.12
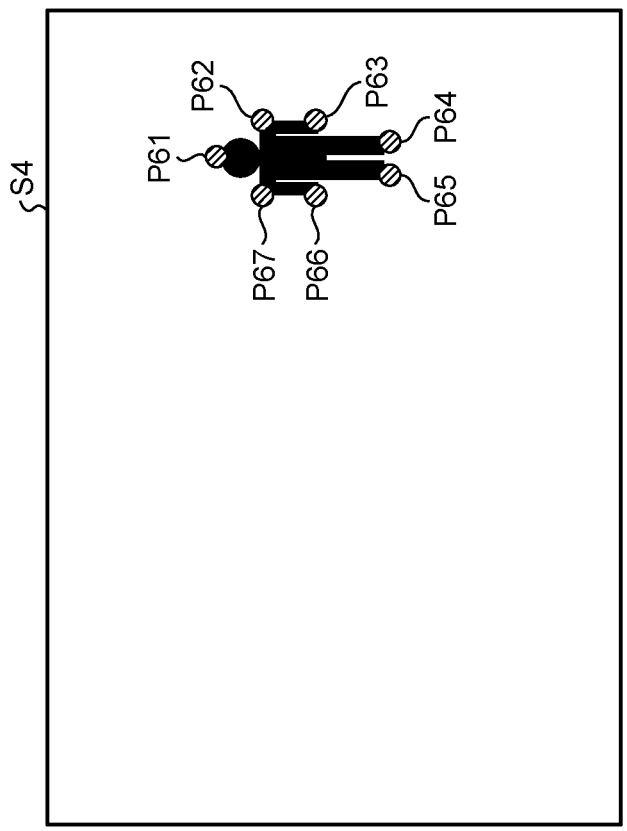
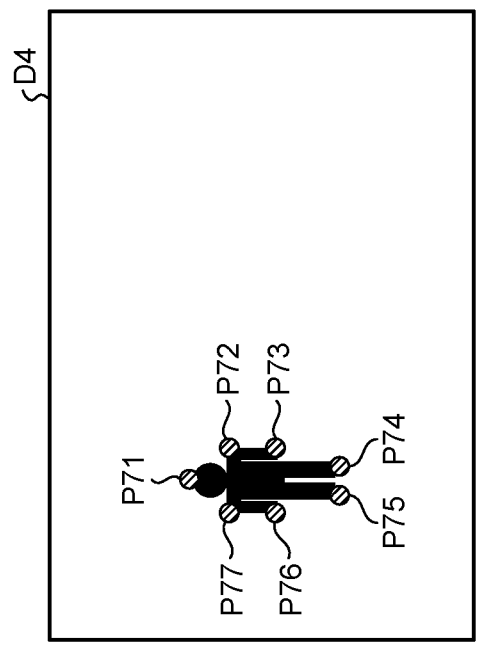

FIG.13
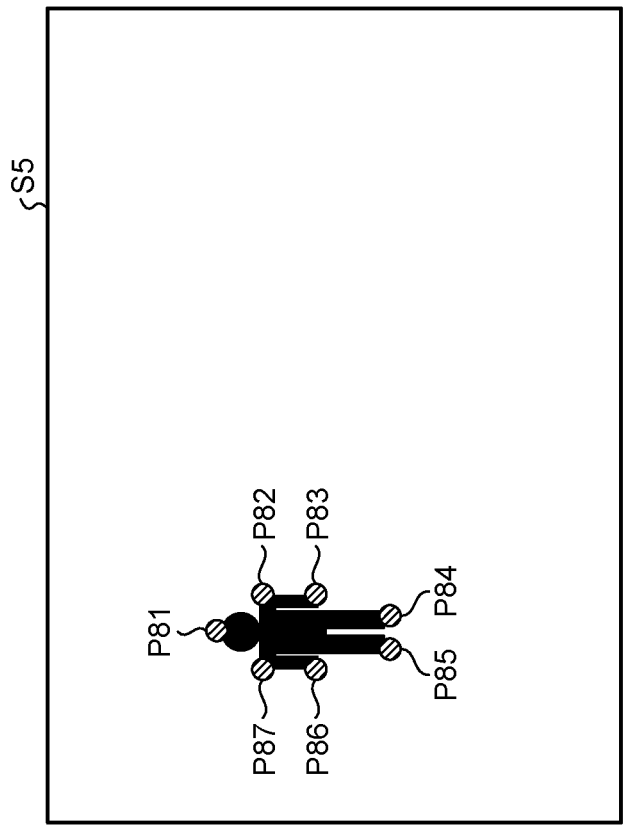
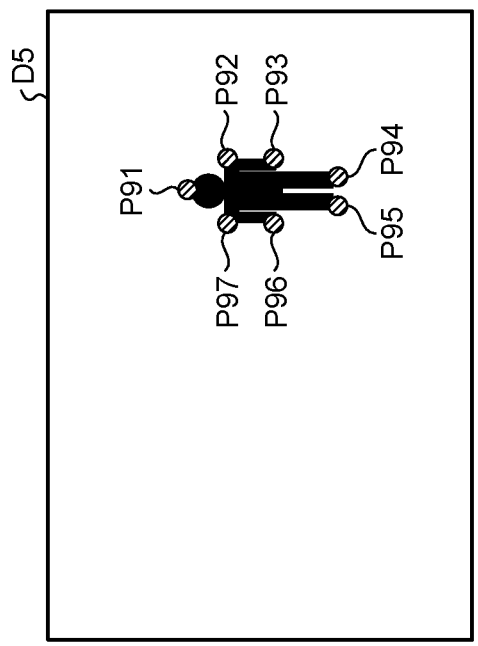

FIG.15
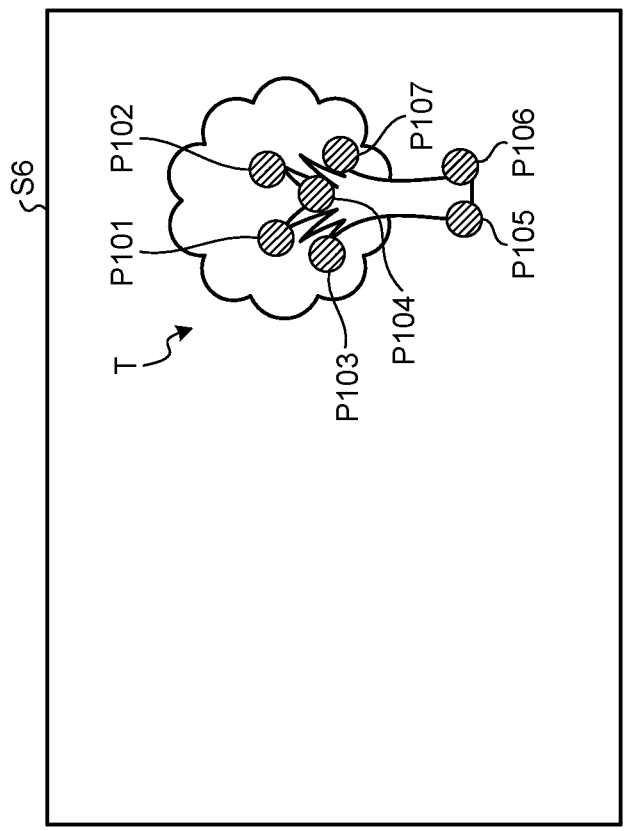
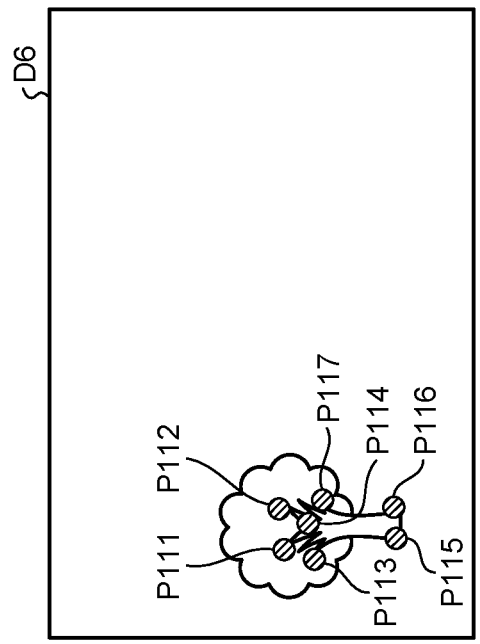

FIG.16
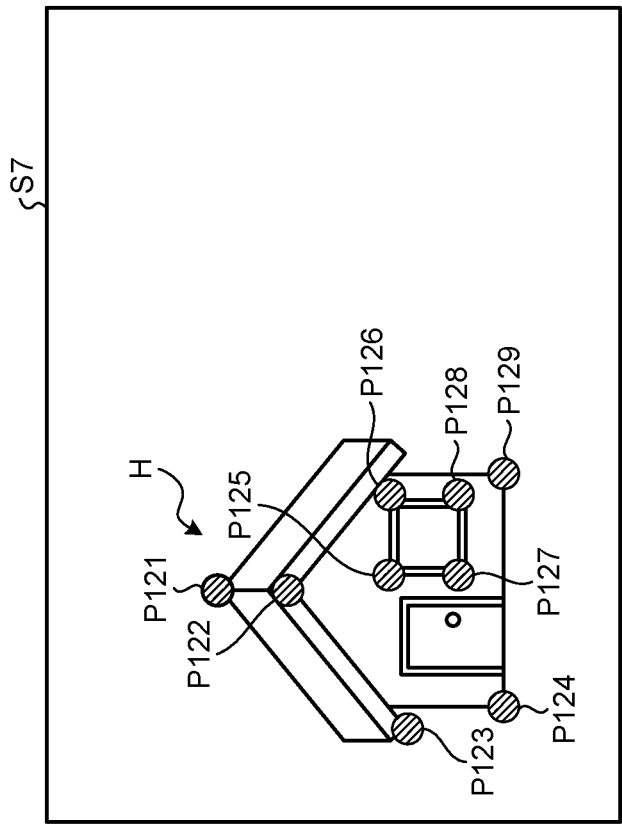
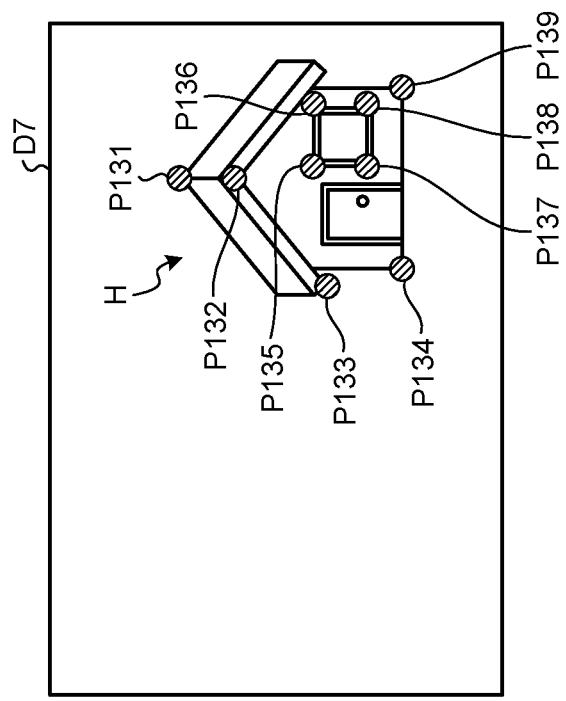

CONTROLLER AND CONTROL METHOD

CROSS REFERENCE TO RELATED APPLICATIONS

This application is a U.S. National Phase of International Patent Application No. PCT/JP2019/047138 filed on Dec. 3, 2019, which claims priority benefit of Japanese Patent Application No. JP 2018-233562 filed in the Japan Patent Office on Dec. 13, 2018. Each of the above-referenced applications is hereby incorporated herein by reference in its entirety.

Field

The present disclosure relates to a controller, a control method, and a control program.

BACKGROUND

There is known a technique for imaging landscapes or the like by installing an imaging device to an unmanned moving body such as a drone.

For example, Patent Literature 1 discloses a controller capable of intuitively instructing a moving body to move by using an image captured by the moving body.

CITATION LIST

Patent Literature

Patent Literature 1: JP 2016-82441 A

SUMMARY

Technical Problem

A distance measuring camera for detecting an obstacle is attached to a moving body as described in Patent Literature 1 separately from an imaging camera. When a plurality of the distance measuring cameras are provided in the moving body, a relative position of a subject imaged by a plurality of the distance measuring cameras is calculated, and a position of an obstacle can be specified accurately by correcting a deviation of the relative position.

Therefore, the present disclosure proposes a controller, a control method, and a control program capable of calculating the relative position of the subject imaged by a plurality of the distance measuring cameras.

Solution to Problem

To solve the problem described above, a controller includes: an acquisition unit that acquires image data captured by an imaging device for photographing disposed in a moving body; and a calculation unit that calculates a relative position of a position of a subject, which is detected by a plurality of distance-measuring imaging devices provided in the moving body, based on the subject included in the image data.

BRIEF DESCRIPTION OF DRAWINGS

FIG. 5 is a schematic diagram illustrating a method for detecting a pair of optimum feature points.

FIG. 8 is a schematic diagram illustrating an example of captured image data and distance measured image data of the first example.

FIG. 9 is a schematic diagram illustrating an example of captured image data and distance measured image data of the first example.

FIG. 12 is a schematic diagram illustrating an example of captured image data and distance measured image data of the second example.

FIG. 13 is a schematic diagram illustrating an example of captured image data and distance measured image data of the second example.

FIG. 15 is a schematic diagram illustrating an example of captured image data and distance measured image data of a third example.

FIG. 16 is a schematic diagram illustrating an example of captured image data and distance measured image data of the third example.

DESCRIPTION OF EMBODIMENTS

Figure 1A:
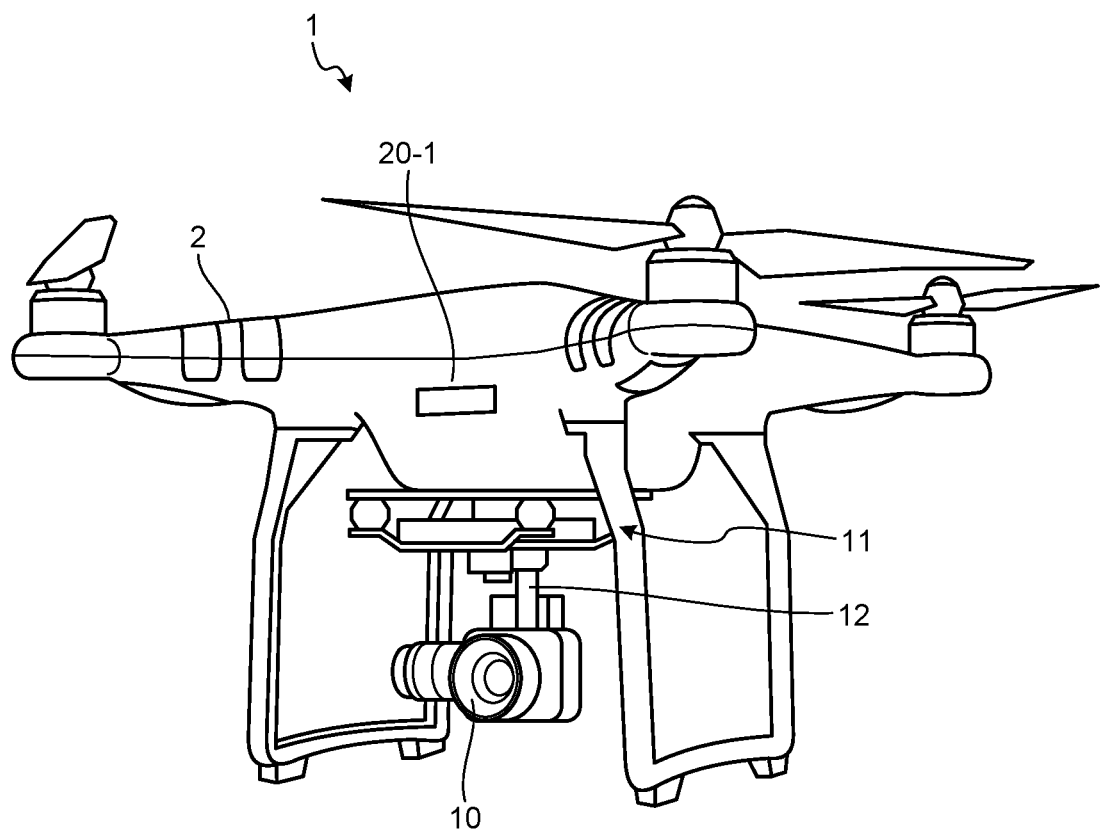
FIG. 1A is a schematic view illustrating an example of a configuration of a moving body according to the present embodiment.

Embodiments of the present disclosure will be described in detail below with reference to the drawings. In each of the following embodiments, the same parts are denoted by the same reference numerals, and an overlapped description will be omitted.

The present disclosure will be described according to an order of items described below.

1. Overview
1-1. An example of Moving body
2. Embodiment
2-1. Configuration of Controller
2-2. Calibration method
2-2-1. First example
2-2-2. Second example 2-2-3. Third example
2-2-4. Fourth example
2-3. Operation of Controller
3. Hardware Configuration 1. Overview

[1-1. Example of Moving Body]

Figure 1B:
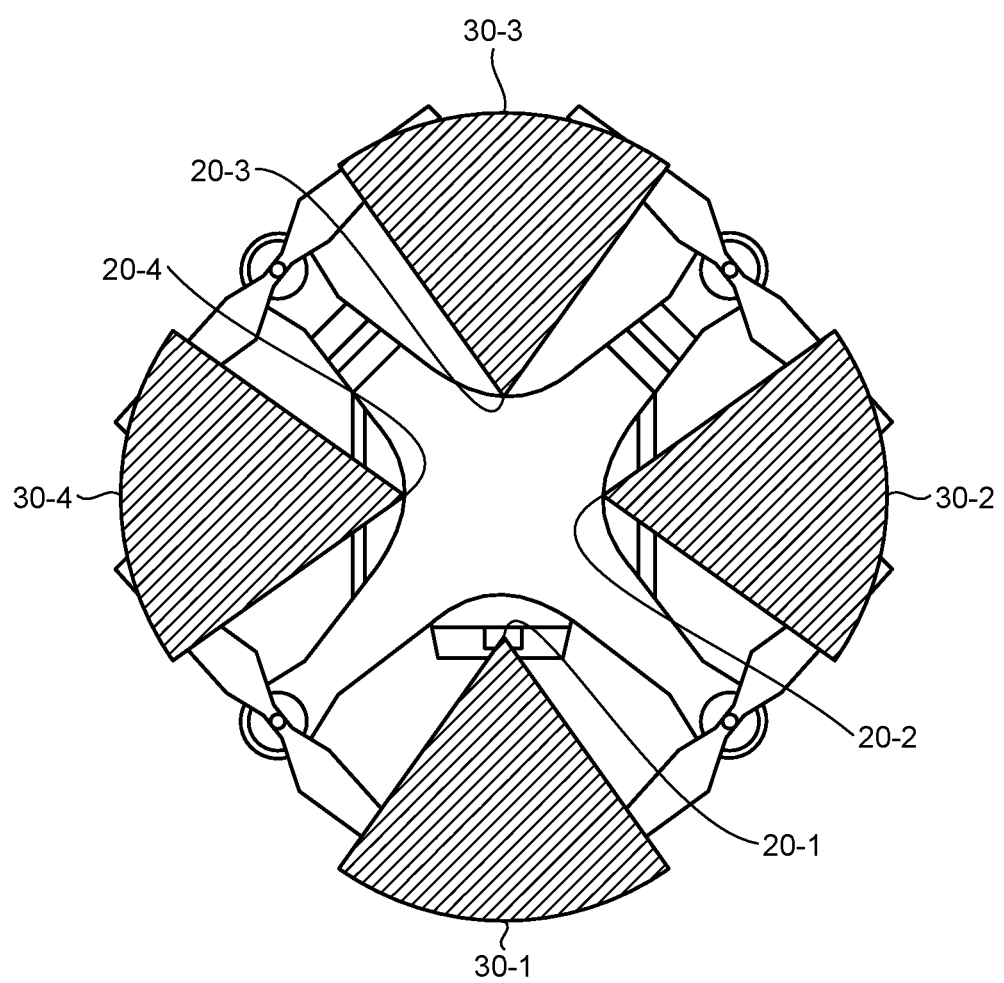
FIG. 1B is a view illustrating a distance measuring range of a moving body according to the present embodiment.

An example of the moving body according to the present embodiment will be described with reference to FIGS. 1A and 1B. FIG. 1A is a schematic view illustrating an example of the moving body according to the present embodiment. FIG. 1B is a schematic view illustrating an example of the moving body according to the present embodiment.

As illustrated in FIGS. 1A and 1B, the moving body according to the present embodiment is, for example, an unmanned flying device 1 such as a drone. The unmanned flying device 1 includes, for example, an imaging camera 10, a first distance measuring camera 20-1, a second distance measuring camera 20-2, a third distance measuring camera 20-3, and a fourth distance measuring camera 20-4. Hereinafter, the moving body according to the present embodiment will be described as the unmanned flying device 1, but this is an example and does not limit the present disclosure. The moving body according to the present disclosure may be an autonomous mobile robot or the like used in a factory or the like.

The imaging camera 10 is provided below a main body 2 of the unmanned flying device 1 by using, for example, a support 11. The imaging camera 10 images, for example, the surroundings of the unmanned flying device 1. The imaging camera 10 images, for example, landscapes or the like while the unmanned flying device 1 flies. Details thereof will be described later, but in the present disclosure, the imaging camera 10 is used for imaging to correct a deviation of a relative value of a subject detected by the first distance measuring camera 20-1 to the fourth distance measuring camera 20-4.

The support 11 supports the imaging camera 10 below the main body 2. The support 11 supports the imaging camera 10 by using, for example, a gimbal mechanism 12. Therefore, the imaging camera 10 is rotatably attached to the main body 2. In other words, the imaging camera 10 is attached to the main body 2 so as to rotate to image the surroundings of the unmanned flying device 1.

As illustrated in FIG. 1B, the first distance measuring camera 20-1 to the fourth distance measuring camera 20-4 are provided along the outer circumference of the main body 2. The first distance measuring camera 20-1 detects an obstacle and the like existing in a first distance measuring range 30-1. The second distance measuring camera 20-2 detects an obstacle and the like existing in a second distance measuring range 30-2. The third distance measuring camera 20-3 detects an obstacle and the like existing in a third distance measuring range 30-3. The fourth distance measuring camera 20-4 detects an obstacle and the like existing in a fourth distance measuring range 30-4. That is, the first distance measuring camera 20-1 to the fourth distance measuring camera 20-4 detect an obstacle existing around the unmanned flying device 1. As a result, the unmanned flying device 1 can detect the obstacle by using the first distance measuring camera 20-1 to the fourth distance measuring camera 20-4, and fly while avoiding the detected obstacle. The first distance measuring camera 20-1 to the fourth distance measuring camera 20-4 can be realized by, for example, a normal imaging camera, a stereo camera, and a time of flight (ToF) camera.

Usually, the calibration is performed on the first distance measuring camera 20-1 to the fourth distance measuring camera 20-4 to match relative positions of the obstacle detected by each distance measuring camera at the time of manufacturing the unmanned flying device 1.

However, after the unmanned flying device 1 is shipped, it is assumed that there will be a deviation from the calibration result at the time of manufacture. For example, there is a possibility that a relationship among relative values of each distance measuring camera is changed due to heat and a temperature exposed to the first distance measuring camera 20-1 to the fourth distance measuring camera 20-4, and a change of a materials of the first distance measuring camera 20-1 to the fourth distance measuring camera 20-4 over time. For example, there is a possibility that a relative positional relationship of each distance measuring camera is changed due to vibration when the unmanned flying device 1 flies. For example, when the unmanned flying device 1 crashes, there is a possibility that the relative positional relationship of each distance measuring camera is changed since an impact is directly applied to each distance measuring camera.

When the relative positional relationship of each distance measuring camera is changed, it is preferable that a calibration is performed on the relative positional relationship of each distance measuring camera even after the shipment. However, as illustrated in FIG. 1B, each distance measuring camera generally is directed in a different direction. Therefore, since the distance measuring range of each distance measuring camera do not overlap with another, it is difficult to detect the change of the relative position, and it is difficult to perform an appropriate calibration.

In the present disclosure, the calibration of the relative position of each distance measuring camera is performed by using the imaging camera 10 and the first distance measuring camera 20-1 to the fourth distance measuring camera 20-4.

2. Embodiment

[2-1. Configuration of Controller]

Figure 2:
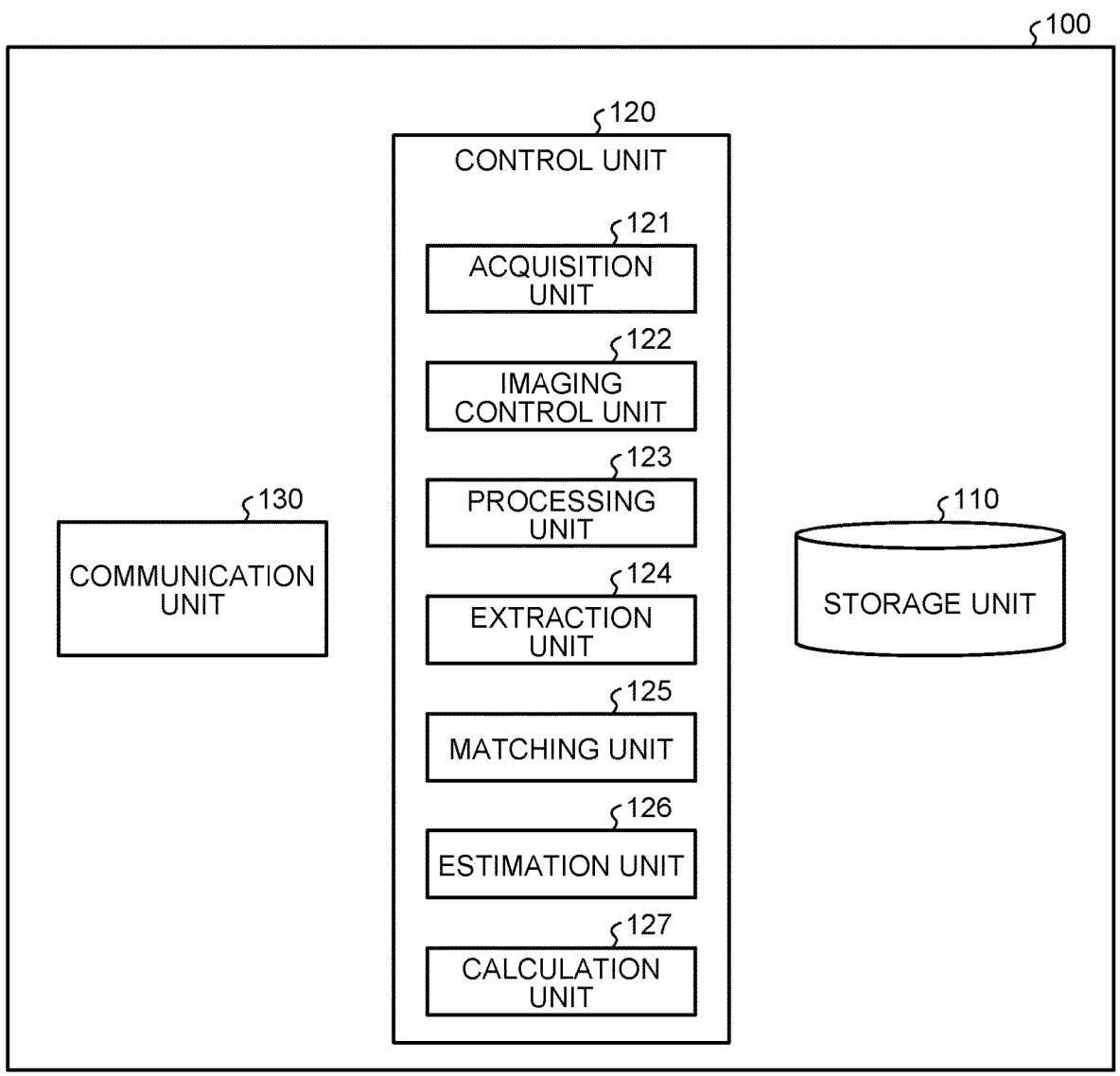
FIG. 2 is a block diagram illustrating an example of a configuration of a controller according to the present embodiment.

The configuration of the controller according to the present embodiment will be described with reference to FIG. 2. FIG. 2 is a block diagram illustrating an example of a configuration of the controller according to the present embodiment.

As illustrated in FIG. 2, a controller 100 according to the present embodiment includes a storage unit 110, a control unit 120, and a communication unit 130. For example, the controller 100 is a device that is mounted on the unmanned flying device 1, can calculate the relative positional relationship of each distance measuring device, and can perform a calibration of the calculated relative positional relationship. For example, the controller 100 may be mounted on an autonomous mobile robot used in a factory or the like.

The storage unit 110 holds various information. For example, the storage unit 110 stores a program for implementing each unit of the controller 100. In this case, the control unit 120 implements the functions of each unit by deploying and executing the program stored in the storage unit 110. For example, the storage unit 110 is realized by a semiconductor memory element such as a random access memory (RAM), a read only memory (ROM) and a flash memory, or a storage device such as a hard disk, a solid state drive and an optical disk. The storage unit 110 may be configured of a plurality of different memories or the like.

For example, the control unit 120 implements various functions by executing a program stored in the storage unit 110. For example, the control unit 120 can be realized by an electronic circuit including a central processing unit (CPU). The control unit 120 includes an acquisition unit 121, an imaging control unit 122, a processing unit 123, an extraction unit 124, a matching unit 125, an estimation unit 126, and a calculation unit 127.

The acquisition unit 121 acquires various information. For example, the acquisition unit 121 acquires image data captured by the imaging camera 10 via the communication unit 130. For example, the acquisition unit 121 acquires the distance measured image data captured by the first distance measuring camera 20-1 to the fourth distance measuring camera 20-4 via the communication unit 130. For example, the acquisition unit 121 outputs the acquired captured image data and distance measured image data to the processing unit 123.

The imaging control unit 122 controls various imaging devices. For example, the imaging control unit 122 controls a timing at which the imaging camera 10 images. For example, the imaging control unit 122 controls a timing at which the first distance measuring camera 20-1 to the fourth distance measuring camera 20-4 measure the distance. For example, in the imaging control unit 122, an imaging timing and distance measuring timing of the imaging camera 10 and the distance measuring camera to be calibrated are synchronized with each other when a calibration of the first distance measuring camera 20-1 to the fourth distance measuring camera 20-4 is performed. In this case, for example, the imaging control unit 122 synchronizes the imaging timing and the distance measuring timing by outputting a synchronization signal to the imaging camera 10 and the distance measuring camera to be calibrated.

The processing unit 123 executes various processing on the captured image data and the distance measured image data. For example, the processing unit 123 corrects lens distortion with respect to the captured image data and the distance measured image data. For example, when formats of the captured image data and the distance measured image data are different from each other, the processing unit 123 converts the format of the captured image data or the distance measured image data into a format having a smaller amount of information. Specifically, the processing unit 123 converts RGB image data into luminance image data when one is the RGB image data and the other is the luminance (Gray) image data. For example, when the image sizes of the captured image data and the distance measured image data are different by a predetermined value or more, the processing unit 123 executes scaling processing to bring both the image sizes closer to each other. For example, the processing unit 123 executes a gamma correction for each pixel of the captured image data and the distance measured image data. The processing executed by the processing unit 123 on the captured image data and the distance measured image data is not limited thereto.

The extraction unit 124 extracts various information from the captured image data and the distance measured image data. For example, the extraction unit 124 extracts a local feature amount such as a corner and an edge from the captured image data and the distance measured image data. For example, the extraction unit 124 detects a local feature amount from images of trees and houses included in the captured image data and the distance measured image data.

For example, the extraction unit 124 may detect an area including a feature amount as a block by template matching. For example, when a calibration board is used for a calibration, the extraction unit 124 may detect a circle of a circle grid or may detect a corner of a chess board.

The extraction unit 124 may detect a convolutional neural network (CNN) feature amount for objecting or matching by a human recognition or an object recognition by performing machine learning such as a deep learning.

For example, the extraction unit 124 does not necessarily have to extract a feature amount from the image data of one frame of the captured image data and the distance measured image data. For example, the extraction unit 124 may extract a feature amount based on a subject such as a person included in the captured image data and the distance measured image data over a plurality of frames in the past. In this case, for example, the extraction unit 124 may detect a change in the position of a person in each image data included in the captured image data and the distance measured image data over a plurality of frames in the past as a feature amount.

Figure 3:
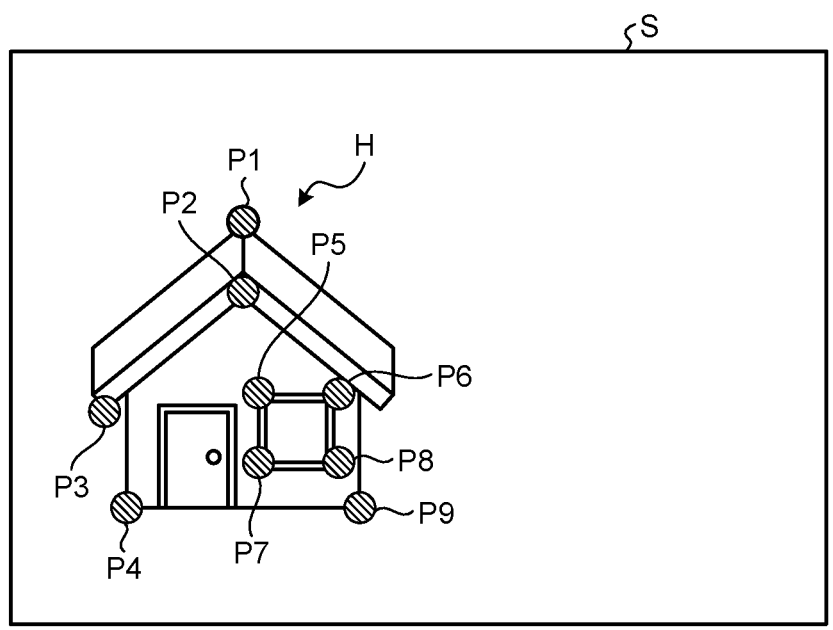
FIG. 3 is a schematic diagram illustrating a feature amount extracted from imaged data.

The feature amount extracted from the captured image data will be described with reference to FIG. 3. FIG. 3 is a schematic diagram illustrating the feature amount extracted from the imaged data.

FIG. 3 is image data S captured by the imaging camera 10. The imaged data S is image data of a house H. In this case, the extraction unit 124 extracts a feature point from the house H.

In FIG. 3, for example, the extraction unit 124 detects a feature point P1, a feature point P2, a feature point P3, a feature point P4, a feature point P5, a feature point P6, a feature point P7, a feature point P8, and a feature point P9 based on gradient information of luminance such as corners and edges of the house H.

The extraction unit 124 extracts feature points not only from the image data captured by the imaging camera 10 but also from the distance measured image data obtained by each distance measuring camera. Specifically, for example, the extraction unit 124 extracts feature points from the distance measured image data obtained for performing a calibration of the relative position among each of the distance measuring cameras.

The number of feature points extracted by the extraction unit 124 is not particularly limited, but from the viewpoint of calibration accuracy, it is preferable to extract at least eight feature points, and it is preferable to extract as many feature points as possible.

Figure 4:
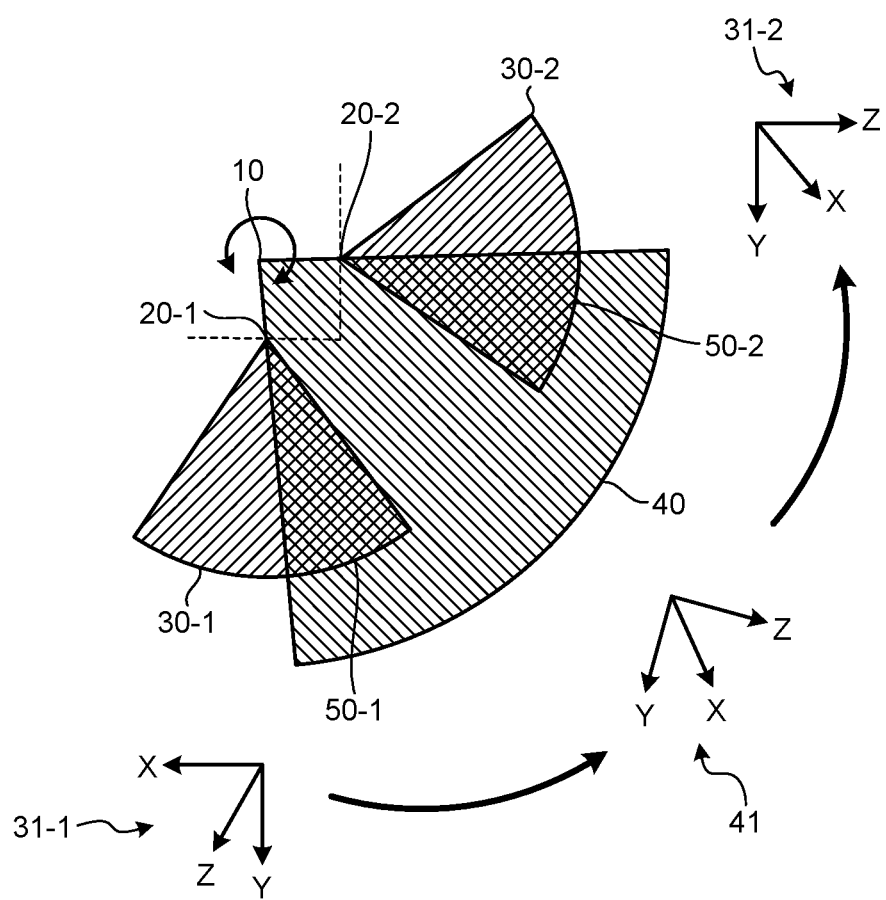
FIG. 4 is a schematic diagram illustrating an imaging method for calibrating each distance measuring camera.

An imaging method for calibrating each distance measuring camera will be described with reference to FIG. 4. FIG. 4 is a schematic diagram illustrating the imaging method for calibrating each distance measuring camera.

FIG. 4 illustrates a method for calibrating a relative position of the first distance measuring camera 20-1 and the second distance measuring camera 20-2. In FIG. 4, the first distance measuring range 30-1 which is a distance measuring range of the first distance measuring camera 20-1, the second distance measuring range 30-2 which is a distance measuring range of the second distance measuring camera 20-2, and an imaging range 40 which is an imaging range of the imaging camera 10 are illustrated.

A first distance measuring coordinate system 31-1 is a coordinate system of a subject imaged by the first distance measuring camera 20-1. A second distance measuring coordinate system 31-22 is a coordinate system of a subject imaged by the second distance measuring camera 20-2. An imaging coordinate system 41 is a coordinate system of a subject imaged by the imaging camera 10.

At least a part of the imaging range 40 of the imaging camera 10 and the first distance measuring range 30-1 overlaps with each other, and a direction of the imaging camera 10 is changed such that at least a part of the imaging range 40 of the imaging camera 10 and a part of the second distance measuring range 30-2 overlaps with each other.

The imaging camera 10 and the first distance measuring camera 20-1 image a subject existing in a first overlapping area 50-1, which is an overlapping area of the imaging range 40 and the first distance measuring range 30-1. The imaging camera 10 and the second distance measuring camera 20-2 image a subject existing in a second overlapping area 50-2, which is an overlapping area of the imaging range 40 and the second distance measuring range 30-2. In this case, it is preferable to adjust the direction of the imaging camera 10 such that the first overlapping area 50-1 and the second overlapping area 50-2 exist at the same time.

The extraction unit 124 extracts feature points from the image data obtained by imaging a subject existing in the first overlapping area 50-1 with each of the imaging camera 10 and the first distance measuring camera 20-1. The extraction unit 124 extracts feature points from the image data obtained by imaging a subject existing in the second overlapping area 50-2 with each of the imaging camera 10 and the second distance measuring camera 20-2.

A method in which the extraction unit 124 extracts the feature points from the distance measured image data captured by the first distance measuring camera 20-1 and the second distance measuring camera 20-2 is the same as the method for extracting the feature points from the captured image data. Therefore, the description thereof will be omitted.

FIG. 2 is referred to again. The matching unit 125 detects matching of various information from the captured image data and the distance measured image data. For example, the matching unit 125 detects corresponding points (pairs of correspondence relationships) of optimum feature points from a list of the feature points extracted from the captured image data and the distance measured image data. For example, the matching unit 125 detects a combination in which a distance between feature amounts is the shortest as a pair of optimum feature points. In this case, for example, the matching unit 125 detects the feature points having the smallest luminance difference between the feature points as a pair of the feature points.

A method for detecting a pair of optimum feature points will be described with reference to FIG. 5. FIG. 5 is a schematic diagram illustrating a method for detecting a pair of the optimum feature points.

A captured image data S1 is, for example, a captured image data of the house H imaged by the imaging camera 10 in the second overlapping area 50-2 in FIG. 4. A distance measured image data D1 is a distance measured image data of the house H imaged by the second distance measuring camera 20-2 in the second overlapping area 50-2 in FIG. 4.

In the case of the example illustrated in FIG. 5, for example, the extraction unit 124 extracts a feature point P1, a feature point P2, a feature point P3, a feature point P4, a feature point P5, a feature point P6, a feature point P7, a feature point P8, and a feature point P9 from the captured image data S1. For example, the extraction unit 124 extracts a feature point P11, a feature point P12, a feature point P13, a feature point P14, a feature point P15, a feature point P16, a feature point P17, a feature point P18, and a feature point P19 from the distance measured image data D1.

Then, the matching unit 125 detects the optimum pair of the feature points P1 to P9 detected from the captured image data S1 and P11 to P19 detected from the distance measured image data D1.

Specifically, for example, the matching unit 125 detects the feature point P1, and the feature point P11 as a pair of the feature points. For example, the matching unit 125 detects the feature point P2, and the feature point P12 as a pair of the feature points. For example, the matching unit 125 detects the feature point P3, and the feature point P13 as a pair of the feature points. For example, the matching unit 125 detects the feature point P4, and the feature point P14 as a pair of the feature points. For example, the matching unit 125 detects the feature point P5, and the feature point P15 as a pair of the feature points. For example, the matching unit 125 detects the feature point P6, and the feature point P16 as a pair of the feature points. For example, the matching unit 125 detects the feature point P7, and the feature point P17 as a pair of the feature points. For example, the matching unit 125 detects the feature point P8, and the feature point P18 as a pair of the feature points. For example, the matching unit 125 detects the feature point P9, and the feature point P19 as a pair of the feature points.

When the calibration of each distance measuring camera is performed by using the calibration board, the processing of the matching unit 125 may be omitted since a pair of the feature points corresponds to each other.

FIG. 2 is referred to again. The estimation unit 126 estimates various information from the captured image data and the distance measured image data. For example, the estimation unit 126 estimates a relative position and a posture of the imaging camera 10 and each distance measuring camera based on the captured image data and the distance measured image data.

Figure 6:
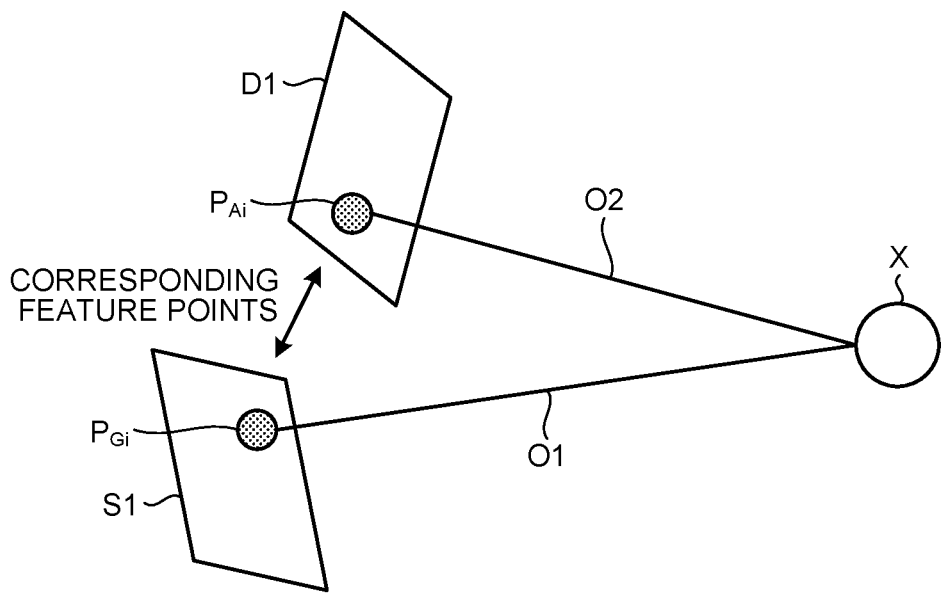
FIG. 6 is a schematic diagram illustrating a relationship between relative positions of the imaging camera and each distance measuring camera.

A method for estimating the relative position relationship between the imaging camera 10 and each distance measuring camera will be described with reference to FIG. 6. FIG. 6 is a schematic diagram illustrating a relative position relationship of the imaging camera 10 and each distance measuring camera.

In FIG. 6, the method for estimating the relative position between the imaging camera 10 and the second distance measuring camera 20-2 is described.

In FIG. 6, an optical axis O1 is a center of an optical axis of the imaging camera 10. An optical axis O2 is a center of an optical axis of the second distance measuring camera 20-2. A three-dimensional point X is a point at which the optical axis O1 and the optical axis O2 intersect.

For example, the captured image data S1 includes a feature point $P_{Gi}$. For example, the distance measured image data D1 includes a feature point $P_{Ai}$. Here, the feature point $P_{Gi}$, and the feature point $P_{Ai}$ are the corresponding feature points.

In this case, the feature point $P_{Gi}$ can be represented by $[u_{gi}, v_{gi}, 1]^T$ as a vector of a pixel position of one point in the captured image data S1 having the i-th correspondence. The feature point $P_{Ai}$ can be represented by $[u_{ai}, v_{ai}, 1]^T$ as a vector of a pixel position of one point in the captured image data S1 having the i-th correspondence.

Then, the estimation unit 126 estimates a fundamental matrix F, which is a 3×3 matrix, and satisfies "$P_{Gi}^T F P_{Ai}=0$". The fundamental matrix F includes an internal parameter of the camera and an external parameter of the camera. In this case, the estimation unit 126 may estimate the fundamental matrix F by using a well-known method. Specifically, the estimation unit 126 may estimate the fundamental matrix F by using a least squares method, a random sample consensus (RANSAC), or the like. In this case, it is preferable that there are eight or more pairs of the feature points that correspond to each other. Once the fundamental matrix F is calculated, it is possible to calculate a rotation matrix R and a translation vector T for a coordinate conversion from the feature point $P_{Gi}$ to the feature point $P_{Ai}$.

FIG. 2 is referred to again. The calculation unit 127 calculates various information from the captured image data and the distance measured image data. For example, the calculation unit 127 calculates the relative position between the imaging camera 10 and each distance measuring camera based on a subject positioned in an overlapping area in which at least a part of the imaging range 40 of the imaging camera 10 and the distance measuring area of a plurality of the distance measuring cameras overlaps with each other. Specifically, the calculation unit 127 calculates the relative position between the first distance measuring camera 20-1 and the second distance measuring camera 20-2 based on a first subject positioned in a first overlapping area 50-1 in which at least a part of the imaging range 40 and the first distance measuring range 30-1 overlaps each other, and a second subject positioned in a second overlapping area 50-2 in which at least a part of the imaging range 40 and the second distance measuring range 30-2 overlaps each other. In this case, for example, the calculation unit 127 calculates a correspondence relationship between the feature point detected from the captured image data of the first subject and the feature point detected from the distance measured image data of the first subject imaged by the first distance measuring camera 20-1. For example, the calculation unit 127 calculates a correspondence relationship between the feature point detected from the captured image data of the second subject and the feature point detected from the distance measured image data of the second subject imaged by the second distance measuring camera 20-2. Then, the calculation unit 127 calculates the relative position between the first distance measuring camera 20-1 and the second distance measuring camera 20-2 based on the calculated correspondence relationship between the two feature points. For example, the calculation unit 127 calculates the relative position between the imaging camera 10 and the second distance measuring camera 20-2 by using the fundamental matrix F estimated by the estimation unit 126.

The calculation unit 127 calculates an elementary matrix E by using the estimated fundamental matrix F. The elementary matrix E can be represented by "$E=K_G^T F K_A$". $K_G$ is an internal parameter of the imaging camera 10. The internal parameter of the imaging camera 10 includes information regarding a viewing angle of the imaging camera 10, and the center of the optical axis, and the like. $K_A$ is an internal parameter of the second distance measuring camera 20-2. The internal parameter of the second distance measuring camera 20-2 includes information regarding a viewing angle of the second distance measuring camera 20-2, and the center of the optical axis, and the like. Here, $K_G$ and $K_A$ are known. Therefore, the calculation unit 127 can calculate the rotation matrix R and the translation vector T by executing a singular value decomposition as represented by an equation of the elementary matrix E.

For example, as illustrated in FIG. 4, the calculation unit 127 calculates the rotation matrix $R_{GA}$ and the translation vector $T_{GA}$ for converting from the first distance measuring coordinate system 31-1 to the imaging coordinate system 41. For example, the calculation unit 127 calculates the rotation matrix $R_{BG}$ and the translation vector $T_{BG}$ for converting from the imaging coordinate system 41 to the second distance measuring coordinate system 31-2. Here, a coordinate of the first distance measuring coordinate system 31-1 is represented by $X_A$, a coordinate of the second distance measuring coordinate system 31-2 is represented by $X_B$, and a coordinate system of the imaging coordinate system 42 is represented by $X_G$.

In this case, $X_G$ can be represented by "$X_G=R_{GA}X_A+T_{GA}$". $X_B$ can be represented by "$X_B=R_{GB}X_G+T_{BG}$". Therefore, when $X_G$ is substituted into an equation of $X_B$, "$X_B=R_{GB}(R_{GA}X_A+T_{GA})+T_{BG}$" is obtained. When this is expanded, $X_B$ can be represented by "$X_B=R_{GA}X_A+T_{BA}$". Accordingly, the conversion from $X_A$ to $X_B$ can be performed. In other words, the calculation unit 127 can calculate the relative position relationship between the first distance measuring camera 20-1 and the second distance measuring camera 20-2. Accordingly, a deviation of the relative positional relationship between the first distance measuring camera 20-1 and the second distance measuring camera 20-2 can be calibrated. In the present disclosure, the relative position among each of the distance measuring cameras can be calculated and a calibration can be performed by the same method.

In the present disclosure, a timing of performing the calibration is not particularly limited after the unmanned flying device 1 is shipped. For example, the controller 100 may execute a calibration at the timing when the unmanned flying device 1 is operated. For example, the controller 100 may periodically execute a calibration by using a time when the imaging camera 10 is not imaging the landscapes or the like. For example, the controller 100 may execute a calibration when a sensor such as an internal measurement unit (IMU) detects a large vibration due to a crash of the unmanned flying device 1. By executing the calibration at these timings, it is possible to prevent the unmanned flying device 1 from being operated in a state where the relative position among each of the distance measuring cameras is deviated. The controller 100 may execute the calibration based on an instruction from the user.

[2-2. Calibration Method]

<2-2-1. First Example>

Figure 7:
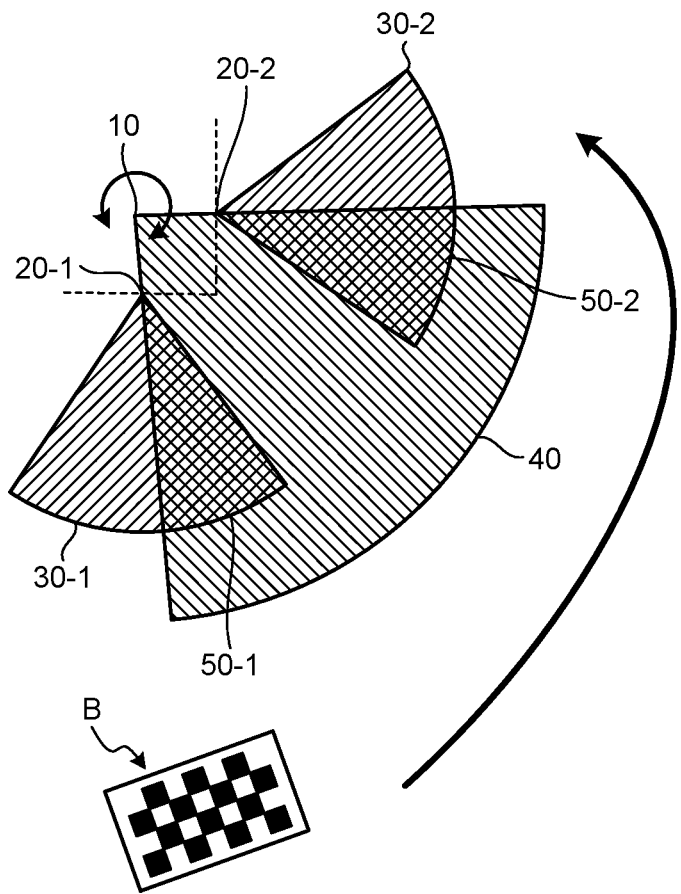
FIG. 7 is a schematic diagram illustrating a first example of a method for performing a calibration.
Figure 10:
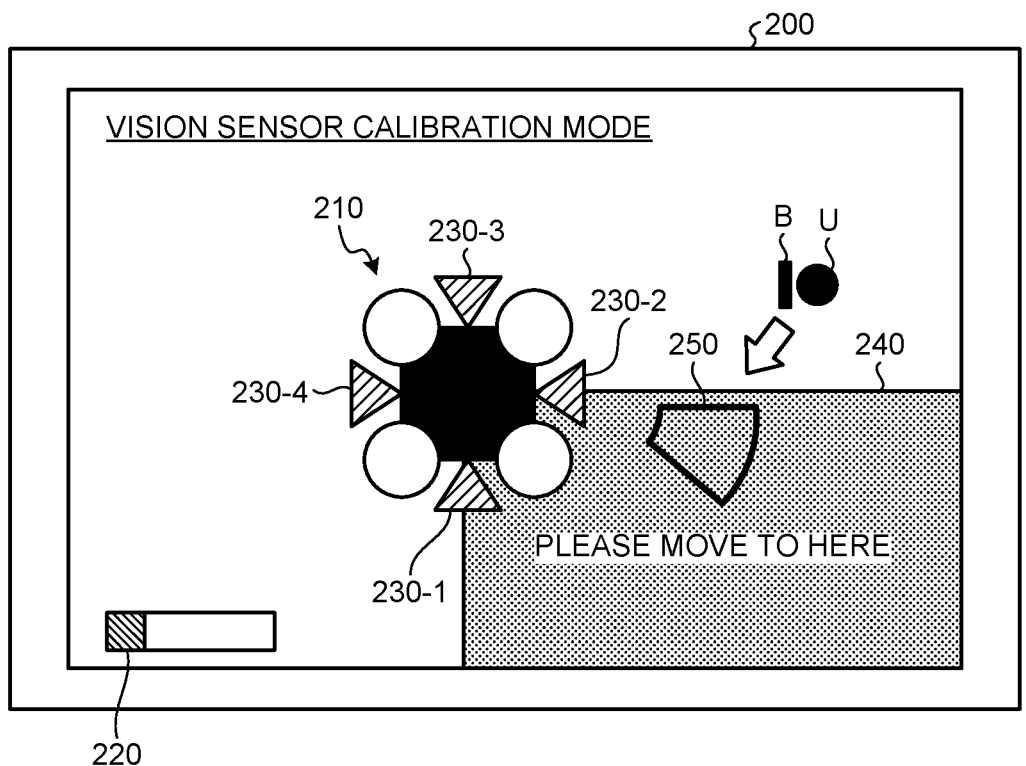
FIG. 10 is a schematic diagram of an example of an instruction for executing a calibration of the first example.

A first example of a method for executing a calibration will be described with reference to FIGS. 7, 8, 9, and 10. FIG. 7 is a schematic diagram illustrating the first example of the method for executing a calibration. FIG. 8 is a schematic diagram illustrating an example of captured image data and distance measured image data of the first example. FIG. 9 is a schematic diagram illustrating an example of captured image data and distance measured image data of the first example. FIG. 10 is a schematic diagram illustrating an example of an instruction for executing the calibration of the first example. A method for calibrating a relative position between the first distance measuring camera 20-1 and the second distance measuring camera 20-2 will be described below.

As illustrated in FIG. 7, in the first example, the relative position between the first distance measuring camera 20-1 and the second distance measuring camera 20-2 is calibrated by using a calibration board B. The calibration board B is, for example, a chess board.

In this case, first, the direction of the imaging camera 10 is adjusted so that the first overlapping area 50-1 and the second overlapping area 50-2 exist. Then, the calibration board B is disposed in the first overlapping area 50-1, and the calibration board B is imaged by the imaging camera 10 and the first distance measuring camera 20-1. Next, the calibration board B is disposed in the second overlapping area 50-2, and the calibration board B is imaged by the imaging camera 10 and the second distance measuring camera 20-2.

FIG. 8 illustrates captured image data S2 and distance measured image data D2 of the calibration board B imaged in the first overlapping area 50-1. The captured image data S2 is image data captured by the imaging camera 10. The distance measured image data D2 is distance measured image data captured by the first distance measuring camera 20-1.

For example, the controller 100 detects a feature point P21, a feature point P22, a feature point P23, a feature point P24, a feature point P25, a feature point P26, a feature point P27, and a feature point P28 from the captured image data S2. For example, the controller 100 detects a feature point P31, a feature point P32, a feature point P33, a feature point P34, a feature point P35, a feature point P36, a feature point P37, and a feature point P38 from the distance measured image data D2. The feature points P21 to P28 are feature points corresponding to the feature points P31 to P38, respectively.

FIG. 9 illustrates captured image data S3 and distance measured image data D3 of the calibration board B imaged in the second overlapping area 50-2. The captured image data S3 is image data captured by the imaging camera 10. The distance measured image data D3 is distance measured image data captured by the second distance measuring camera 20-2.

For example, the controller 100 detects a feature point P41, a feature point P42, a feature point P43, a feature point P44, a feature point P45, a feature point P46, a feature point P47, and a feature point P48 from the captured image data S3. For example, the controller 100 detects a feature point P51, a feature point P52, a feature point P53, a feature point P54, a feature point P55, a feature point P56, a feature point P57, and a feature point P58 from the distance measured image data D3. The feature points P51 to P58 are feature points corresponding to the feature points P51 to P58, respectively.

The controller 100 can calculate the relative position between the first distance measuring camera 20-1 and the second distance measuring camera 20-2 based on each feature point extracted from the calibration board B disposed in the first overlapping area 50-1 and the second overlapping area 50-2. Then, the controller 100 can execute a calibration of the relative position between the first distance measuring camera 20-1 and the second distance measuring camera 20-2. Since the method for estimating the relative position is as described above, the description thereof will be omitted.

FIG. 10 is an example of a display screen showing an instruction to the user when the first distance measuring camera 20-1 and the second distance measuring camera 20-2 are calibrated. A display screen 200 is, for example, a display screen displayed on a radio-type controller, a smartphone, a tablet terminal, or the like of the unmanned flying device 1.

The display screen 200 includes an unmanned flying device icon 210, a progress bar 220, a first distance measuring range icon 230-1, a second distance measuring range icon 230-2, a third distance measuring range icon 230-3, a fourth distance measuring range icon 230-4, an imaging range icon 240, and an instruction area 250.

The unmanned flying device icon 210 indicates the unmanned flying device 1. The progress bar 220 shows a progress state of a calibration. By checking the progress bar 220, the progress of the calibration can be appropriately grasped.

The first to fourth distance measuring range icons 230-1 to 230-4 indicate the first to fourth distance measuring ranges 30-1 to 30-4, respectively. The imaging range icon 240 indicates an imaging range 40. The instruction area 250 indicates an area to which the user is caused to move.

For example, on the display screen 200, by displaying "Please move to here" in the instruction area 250, the user U is urged to hold the calibration board B and move to the instruction area 250. As a result, the user U can calculate the relative position between the first distance measuring camera 20-1 and the second distance measuring camera 20-2 and execute a calibration by moving to the instructed area with the calibration board B, for example. That is, by displaying the display screen 200, it is possible to easily calculate the relative position between each camera and execute the calibration.

<2-2-2. Second Example>

Figure 11:
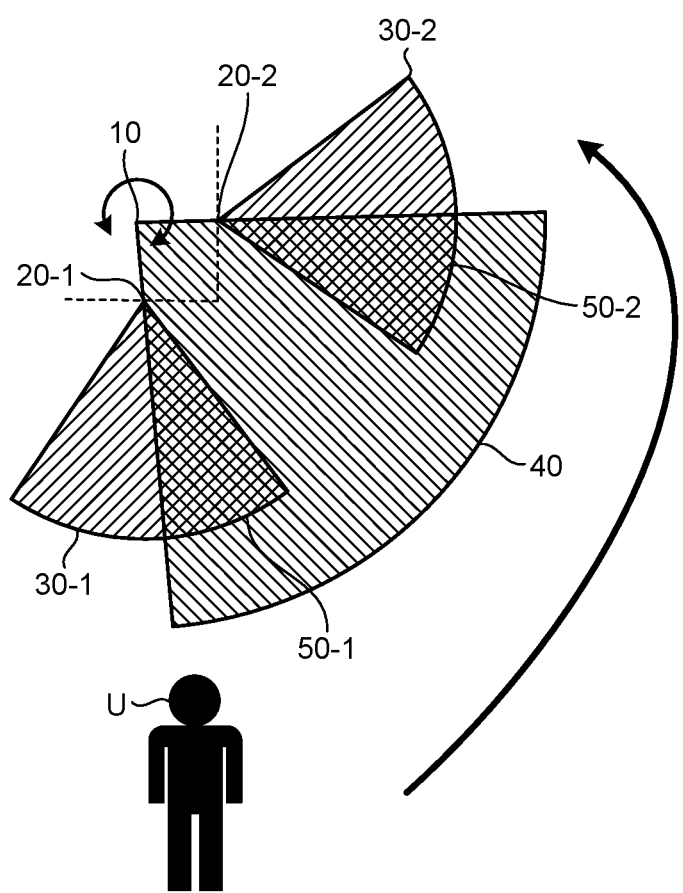
FIG. 11 is a schematic diagram illustrating a second example of a method for performing a calibration.
Figure 14:
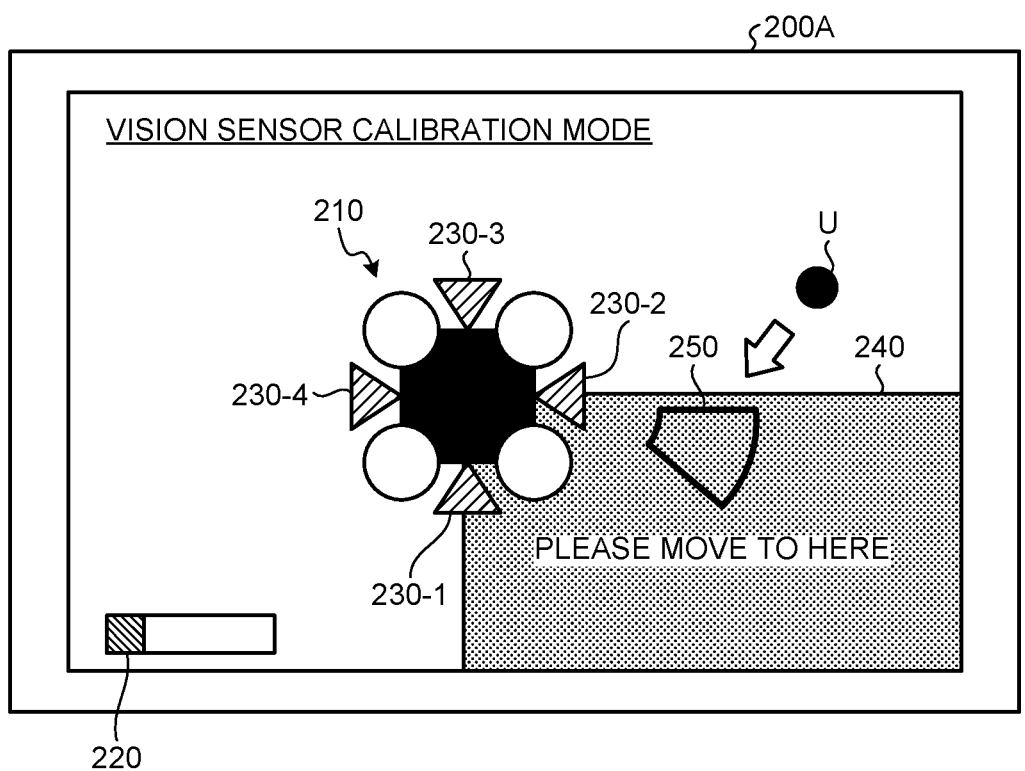
FIG. 14 is a schematic diagram of an example of an instruction for executing a calibration of the second example.

A second example of a method for executing a calibration will be described with reference to FIGS. 11, 12, 13, and 14. FIG. 11 is a schematic diagram illustrating the second example of the method for executing a calibration. FIG. 12 is a schematic diagram illustrating an example of captured image data and distance measured image data of the second example. FIG. 13 is a schematic diagram illustrating an example of captured image data and distance measured image data of the second example. FIG. 14 is a schematic diagram illustrating an example of an instruction for executing the calibration of the second example. A method for calibrating a relative position between the first distance measuring camera 20-1 and the second distance measuring camera 20-2 will be described below.

As illustrated in FIG. 11, in the second example, the relative position between the first distance measuring camera 20-1 and the second distance measuring camera 20-2 is calibrated by imaging the user U himself or herself.

In this case, first, the user U moves to the first overlapping area 50-1, and images himself or herself by using the imaging camera 10 and the first distance measuring camera 20-1. Next, the user U moves to the second overlapping area 50-2, and images himself or herself by using the imaging camera 10 and the second distance measuring camera 20-2.

FIG. 12 illustrates captured image data S4 and distance measured image data D4 of the user U imaged in the first overlapping area 50-1. The captured image data S4 is image data captured by the imaging camera 10. The distance measured image data D4 is distance measured image data captured by the first distance measuring camera 20-1.

For example, the controller 100 detects a feature point P61, a feature point P62, a feature point P63, a feature point P64, a feature point P65, a feature point P66, and a feature point P67 from the captured image data S4. For example, the controller 100 detects a feature point P71, a feature point P72, a feature point P73, a feature point P74, a feature point P75, a feature point P76, and a feature point P77 from the distance measured image data D4. The feature points P61 to P67 are feature points corresponding to the feature points P71 to P77, respectively.

FIG. 13 illustrates captured image data S5 and distance measured image data D5 of the user U imaged in the second overlapping area 50-2. The captured image data S5 is image data captured by the imaging camera 10. The distance measured image data D5 is distance measured image data captured by the second distance measuring camera 20-2.

For example, the controller 100 detects a feature point P81, a feature point P82, a feature point P83, a feature point P84, a feature point P85, a feature point P86, and a feature point P87 from the captured image data S5. For example, the controller 100 detects a feature point P91, a feature point P92, a feature point P93, a feature point P94, a feature point P95, a feature point P96, and a feature point P97 from the distance measured image data D5. The feature points P81 to P87 are feature points corresponding to the feature points P91 to P97, respectively.

The controller 100 can calculate the relative position between the first distance measuring camera 20-1 and the second distance measuring camera 20-2 based on each feature point extracted from the user U positioned in the first overlapping area 50-1 and the second overlapping area 50-2. Then, the controller 100 can execute a calibration of the relative position between the first distance measuring camera 20-1 and the second distance measuring camera 20-2. Since the method for estimating the relative position is as described above, the description thereof will be omitted.

FIG. 14 is an example of a display screen showing an instruction to the user when the first distance measuring camera 20-1 and the second distance measuring camera 20-2 are calibrated.

A display screen 200A includes an unmanned flying device icon 210, a progress bar 220, a first distance measuring range icon 230-1, a second distance measuring range icon 230-2, a third distance measuring range icon 230-3, a fourth distance measuring range icon 230-4, an imaging range icon 240, and an instruction area 250.

For example, on the display screen 200A, by displaying "Please move to here" in the instruction area 250, the user U is urged to move to the instruction area 250. As a result, for example, the controller 100 can calculate the relative position between the first distance measuring camera 20-1 and the second distance measuring camera 20-2, and execute a calibration based on feature points detected from the user U who moved to the instructed area. That is, by displaying the display screen 200A, it is possible to easily calculate the relative position between each camera and easily execute the calibration.

<2-2-3. Third Example>

A third example of a method for executing a calibration will be described with reference to FIGS. 15, and 16. FIG. 15 is a schematic diagram illustrating an example of captured image data and distance measured image data of the third example. FIG. 16 is a schematic diagram illustrating an example of captured image data and distance measured image data of the third example.

In the first example and the second example described above, a relative value of each distance measuring camera was calculated, and the calibration was executed by imaging the same subject and detecting the feature points in the first overlapping area 50-1 and the second overlapping area 50-2. However, the subjects imaged in the first overlapping area 50-1 and the second overlapping area 50-2 may be different from each other.

FIG. 15 illustrates captured image data S6 and distance measured image data D6 of a tree T imaged in first overlapping area 50-1. The captured image data S6 is image data captured by the imaging camera 10. The distance measured image data D6 is distance measured image data captured by the first distance measuring camera 20-1.

For example, the controller 100 detects a feature point P101, a feature point P102, a feature point P103, a feature point P104, a feature point P105, a feature point P106, and a feature point P107 from the captured image data S6. For example, the controller 100 detects a feature point P111, a feature point P112, a feature point P113, a feature point P114, a feature point P115, a feature point P116, and a feature point P117 from the distance measured image data D6. The feature points P101 to P107 are feature points corresponding to the feature points P111 to P117, respectively.

FIG. 16 illustrates captured image data S7 and distance measured image data D7 of the house H imaged in second overlapping area 50-2. The captured image data S7 is image data captured by the imaging camera 10. The distance measured image data D7 is distance measured image data captured by the second distance measuring camera 20-2.

For example, the controller 100 detects a feature point P121, a feature point P122, a feature point P123, a feature point P124, a feature point P125, a feature point P126, a feature point P127, a feature point P128, and a feature point P129 from the captured image data S7. For example, the controller 100 detects a feature point P131, a feature point P132, a feature point P133, a feature point P134, a feature point P135, a feature point P136, a feature point P137, a feature point P138, and a feature point P139 from the distance measured image data D7. The feature points P121 to P129 are feature points corresponding to the feature points P131 to P139, respectively.

The controller 100 can calculate the relative position between the first distance measuring camera 20-1 and the second distance measuring camera 20-2 based on each feature point extracted from the tree T positioned in the first overlapping area 50-1 and each feature point extracted from the house H positioned in the second overlapping area 50-2. In this case, for example, the controller 100 can calculate the relative position between each distance measuring camera, and execute the calibration based on any subject positioned in the first overlapping area 50-1 and the second overlapping area 50-2 while the unmanned flying device 1 is flying.

<2-2-4. Fourth Example>

Figure 17:
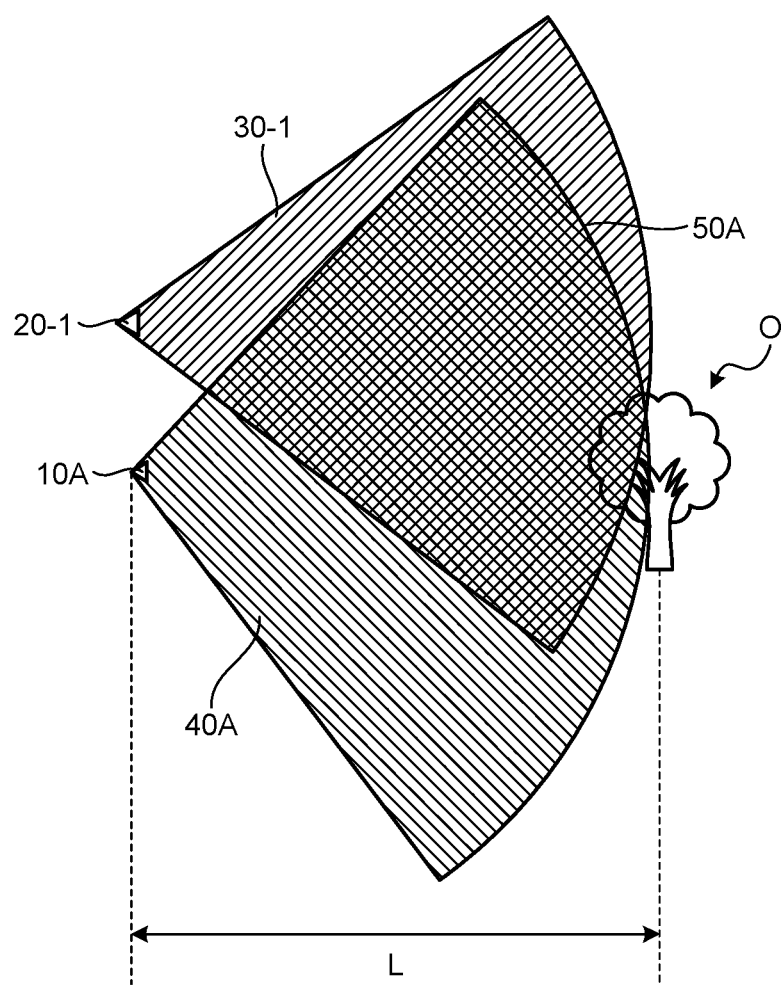
FIG. 17 is a schematic diagram illustrating a fourth example of a method for performing a calibration.

A fourth example of a method for executing a calibration will be described with reference to FIG. 17. FIG. 17 is a schematic diagram illustrating the fourth example of the method for executing a calibration.

In the first to third examples, the relative position among each of the distance measuring cameras is calculated by using the imaging camera 10 and each distance measuring camera attached at the time of shipment of the unmanned flying device 1, and the calibration is executed. However, it is assumed that the imaging camera 10 is replaced by the user after the unmanned flying device 1 is shipped. In this case, usually, in the imaging camera 10 before replacement and an imaging camera 10A after replacement, the internal parameters are different from each other. Therefore, it is preferable that a calibration including an internal parameter estimation of the imaging camera is executed in the imaging camera 10A and each distance measuring camera. A method for executing a calibration in the imaging camera 10A and the first distance measuring camera 20-1 will be described below.

In this case, as illustrated in FIG. 17, first, the imaging camera 10A and the first distance measuring camera 20-1 are directed in the same direction. Then, an overlapping area 50A in which at least a part of an imaging range 40A of the imaging camera 10A and the first distance measuring range 30-1 of the first distance measuring camera overlaps each other is generated.

In this case, an arbitrary subject 0 positioned in the overlapping area 50A is imaged by the imaging camera 10A and the first distance measuring camera 20-1. Then, the feature points and data of a distance to the feature points are extracted from the captured image data captured by the imaging camera 10A and the distance measured image data captured by the first distance measuring camera 20-1. As a result, size of the subject O imaged by the first distance measuring camera 20-1 is known, and the internal parameter of the imaging camera 10A can be estimated. For the subsequent calibration steps, the relative position between the imaging camera 10A and the first distance measuring camera 20-1 is calculated and the calibration is executed by using the methods of the first to third examples described above. That is, in the present disclosure, the relative position between the imaging camera 10A and each distance measuring camera can be calculated, and the calibration can be executed.

[2-3. Operation of Controller]

Figure 18:
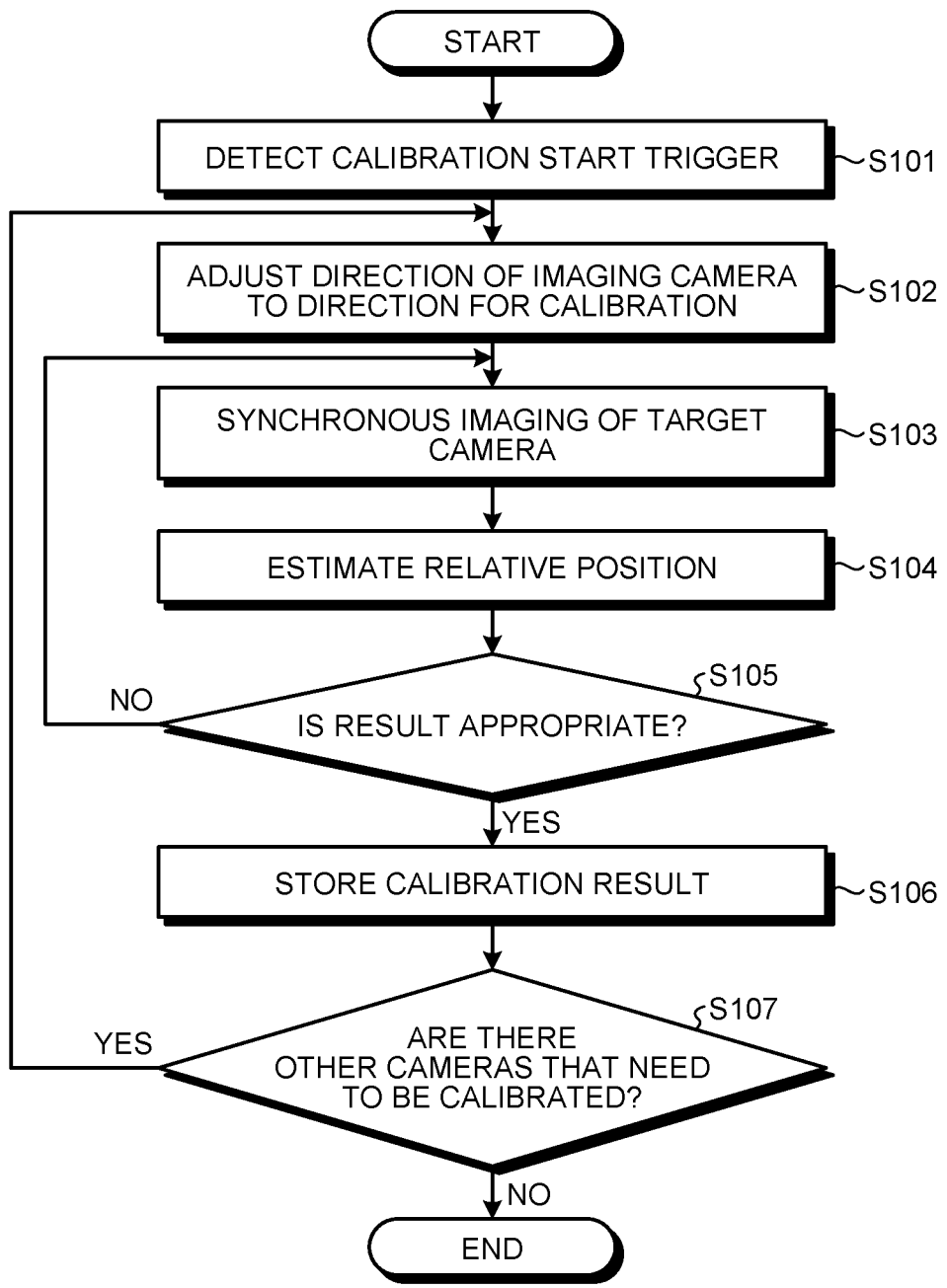
FIG. 18 is a flowchart illustrating an example of a processing flow of a controller.

Next, a processing flow of the controller will be described with reference to FIG. 18. FIG. 18 is a flowchart illustrating an example of the processing flow of the controller.

First, the controller 100 detects a trigger for starting a calibration (Step S101). The controller 100 starts the calibration by detecting the trigger. Then, the controller 100 causes the processing to proceed to Step S102.

Next, the controller 100 adjusts a direction of the imaging camera 10 to a direction for calibration (Step S102). Specifically, the controller 100 controls the imaging camera 10 with the gimbal mechanism 12, and adjusts the direction according to the distance measuring camera to be calibrated. Then, the controller 100 causes the processing to proceed to Step S103.

Next, the controller 100 synchronizes the imaging camera 10 with the distance measuring camera to be calibrated, and images the subject (Step S103). Then, the controller 100 causes the processing to proceed to Step S104.

Next, the controller 100 estimates a relative position of the distance measuring camera to be calibrated with respect to the imaging camera 10 based on the imaged result of the subject (Step S104). Here, the controller 100 may estimate a posture of the distance measuring camera with respect to the imaging camera 10. Then, the controller 100 causes the processing to proceed to Step S105.

In Step S105, the controller 100 determines whether or not the estimation result of the relative position is appropriate.

When the estimation result is not appropriate (No in Step S105), the controller 100 returns the processing to Step S103 and executes the above-described processing. On the other hand, when the estimation result is appropriate (Yes in Step S105), the controller 100 causes the processing to proceed to Step S106.

Next, the controller 100 executes the calibration, and stores the calibration result in the storage unit 110 (Step S106). Then, the controller 100 causes the processing to proceed to Step S107.

Next, in Step S107, the controller 100 determines whether or not there are other distance measuring cameras that need to be calibrated.

When there is a distance measuring camera that needs to be calibrated (Yes in Step S107), the controller 100 returns the processing to Step S102, and executes the above-described processing. On the other hand, when there is no distance measuring camera that needs to be calibrated (No in Step S107), the controller 100 ends the processing of FIG. 18.

Figure 19:
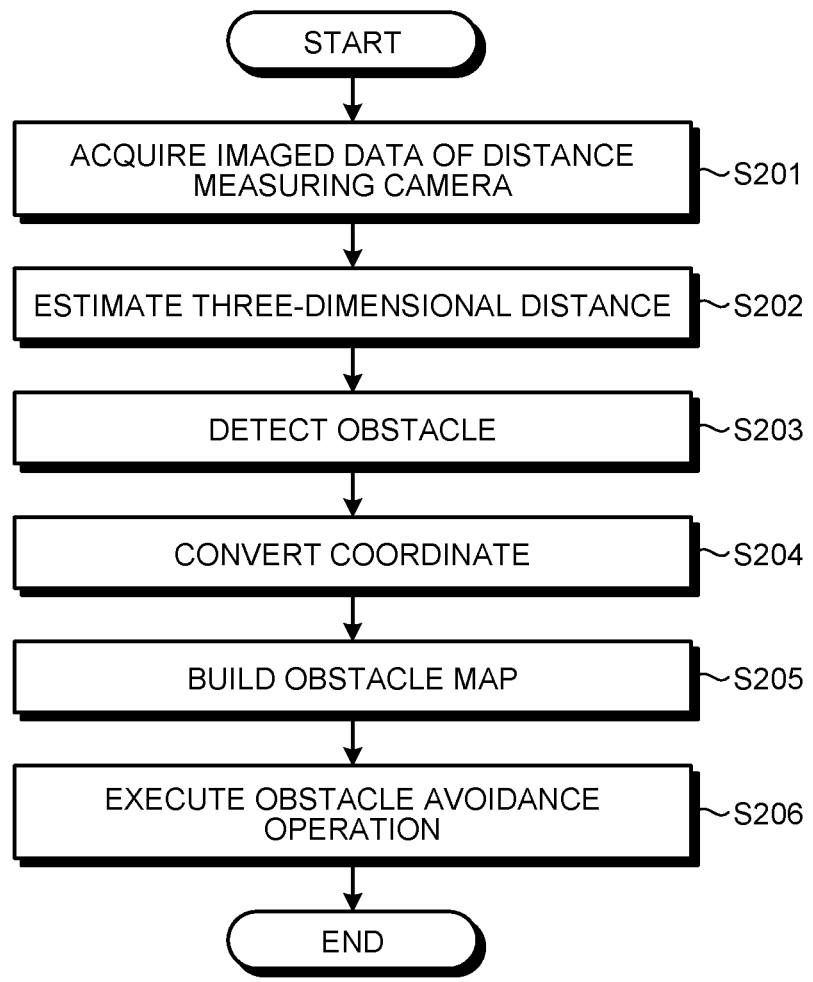
FIG. 19 is a flowchart illustrating an example of a processing flow of an unmanned flying device.

A flow of an operation in which the unmanned flying device detects an obstacle and avoids the obstacle will be described with reference to FIG. 19. FIG. 19 is a flowchart illustrating an example of the flow of the processing in which the unmanned flying device 1 avoids the obstacle by using the calibration result.

First, the unmanned flying device 1 acquires imaged data obtained by imaging the surroundings of the unmanned flying device 1 with the imaging camera 10 and each distance measuring camera (Step S201). Then, the unmanned flying device 1 causes the processing to proceed to Step S202.

Next, the unmanned flying device 1 estimates a three-dimensional distance to an object around the unmanned flying device 1 based on the imaged data (Step S202). Then, the unmanned flying device 1 causes the processing to proceed to Step S203.

Next, the unmanned flying device 1 detects an obstacle that has to be avoided based on the three-dimensional distance to the surrounding object (Step S203). Specifically, for example, the unmanned flying device 1 detects an obstacle that has to be avoided in a coordinate system of the first distance measuring camera 20-1 and a coordinate system of the second distance measuring camera 20-2. Then, the unmanned flying device 1 causes the processing to proceed to Step S204.

Next, the unmanned flying device 1 converts a coordinate system of the obstacle detected in the coordinate system of the first distance measuring camera 20-1 and the coordinate system of the second distance measuring camera 20-2 into a unified coordinate system of the imaging camera 10 (Step S204). Then, the unmanned flying device 1 causes the processing to proceed to Step S205.

Next, the unmanned flying device 1 builds an obstacle map including information regarding the obstacle existing around the unmanned flying device 1 in the unified coordinate system (Step S205). Then, the unmanned flying device 1 causes the processing to proceed to Step S206.

Next, the unmanned flying device 1 executes an obstacle avoidance operation based on the obstacle map (Step S206). Then, the unmanned flying device 1 ends the processing of FIG. 19.

3. Hardware Configuration

Figure 20:
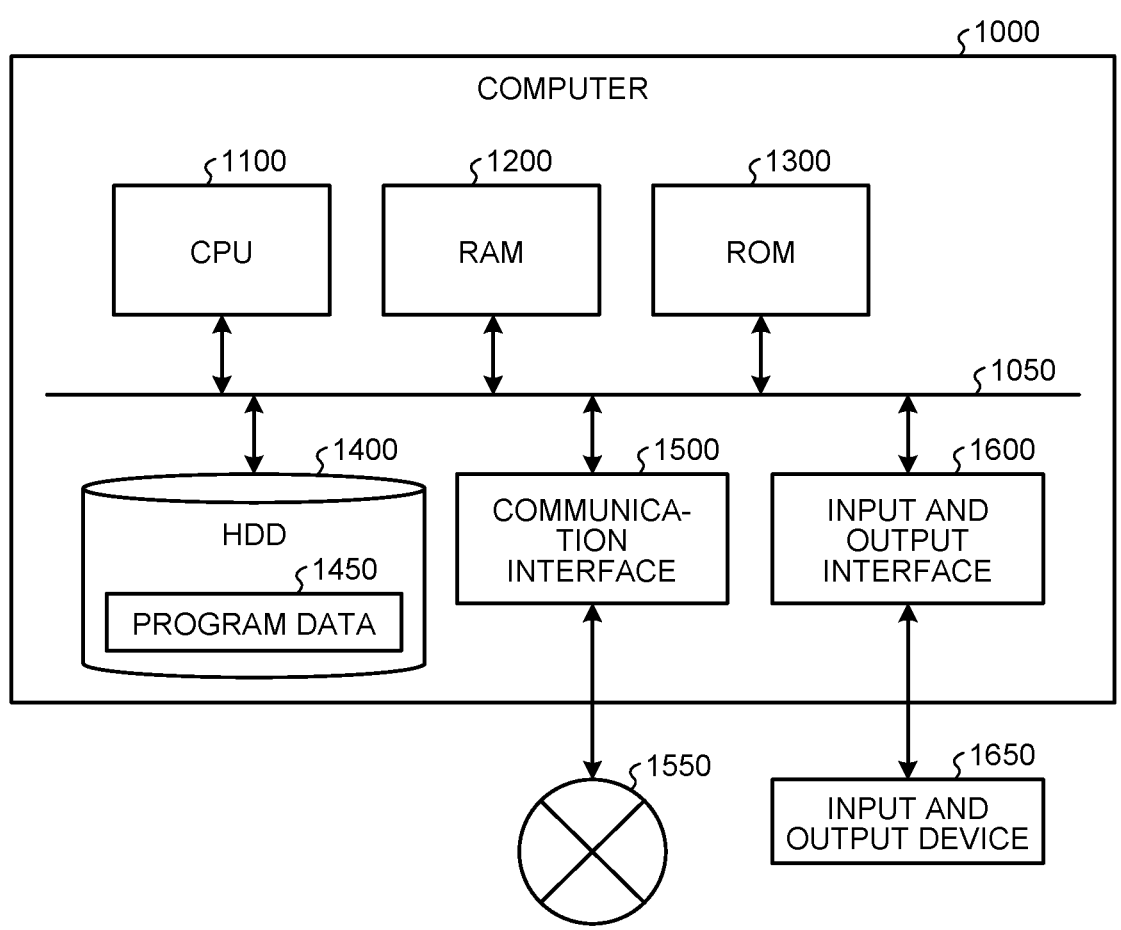
FIG. 20 is a hardware configuration diagram illustrating an example of a computer that implements a function of a controller.

The controller 100 according to each of the above-described embodiments is implemented by, for example, a computer 1000 having a configuration as illustrated in FIG. 20. FIG. 20 is a hardware configuration diagram illustrating an example of the computer 1000 that implements a function of the controller 100. The computer 1000 includes a CPU 1100, a RAM 1200, a read only memory (ROM) 1300, a hard disk drive (HDD) 1400, a communication interface 1500, and an input and output interface 1600. Each part of the computer 1000 is connected with another by a bus 1050.

The CPU 1100 operates based on a program stored in the ROM 1300 or the HDD 1400, and controls each part. For example, the CPU 1100 deploys the program stored in the ROM 1300 or the HDD 1400 on the RAM 1200, and executes processing corresponding to various programs.

The ROM 1300 stores a boot program such as a basic input output system (BIOS) executed by the CPU 1100 when the computer 1000 is started, and a program, and the like that depends on hardware of the computer 1000.

The HDD 1400 is a computer-readable recording medium that non-temporarily records a program executed by the CPU 1100 and data used by the program. Specifically, the HDD 1400 is a recording medium that records the program according to the present disclosure, which is an example of program data 1450.

The communication interface 1500 is an interface for connecting the computer 1000 to an external network 1550 (for example, Internet). For example, the CPU 1100 receives data from other devices or transmits data generated by the CPU 1100 to other devices via the communication interface 1500.

The input and output interface 1600 is an interface for connecting an input and output device 1650 to the computer 1000. For example, the CPU 1100 receives data from an input device such as a keyboard or a mouse via the input and output interface 1600. The CPU 1100 transmits data to an output device such as a display, a speaker, and a printer via the input and output interface 1600. The input and output interface 1600 may function as a media interface for reading a program or the like recorded in a predetermined recording medium (media). For example, the medium is an optical recording medium such as a digital versatile disc (DVD) or a phase change rewritable disk (PD), a magneto-optical recording medium such as a magneto-optical disk (MO), a tape medium, a magnetic recording medium, or a semiconductor memory.

For example, when the computer 1000 functions as the controller 100, the CPU 1100 of the computer 1000 implements the function of each part by executing the program loaded on the RAM 1200. The program according to the present disclosure is stored in the HDD 1400. The CPU 1100 reads the program data 1450 from the HDD 1400 and executes the program, but as another example, these programs may be acquired from other devices via the external network 1550.

The effects described in the present specification are merely examples and are not limited, and other effects may be obtained.

The present technique can also have the following configurations.

(1)

A controller comprising:

an acquisition unit that acquires image data captured by an imaging device for photographing disposed in a moving body; and a calculation unit that calculates a relative position of a position of a subject, which is detected by a plurality of distance-measuring imaging devices provided in the moving body, based on the subject included in the image data.

(2)

The controller according to (1), wherein the calculation unit calculates the relative position based on the subject positioned in an overlapping area in which at least a part of an imaging area of the imaging device for photographing and a distance measuring area of a plurality of the distance-measuring imaging devices overlaps each other.

(3)

The controller according to (1) or (2), wherein the imaging device for photographing is rotatably disposed in the moving body.

(4)

The controller according to (3), wherein the calculation unit calculates the relative position between a first distance-measuring imaging device and a second distance-measuring imaging device based on a first subject positioned in a first overlapping area in which at least a part of the imaging area and a first distance measuring area of the first distance-measuring imaging device of a plurality of the distance-measuring imaging devices overlaps each other, and a second subject positioned in a second overlapping area in which at least a part of the imaging area and a second distance measuring area of the second distance-measuring imaging device of a plurality of the distance-measuring imaging devices overlaps each other.

(5)

The controller according to (4), wherein at least one of the first overlapping area and the second overlapping area is generated by rotating the imaging device for photographing.

(6)

The controller according to (4) or (5), wherein the first overlapping area and the second overlapping area are generated at the same time by rotating the imaging device for photographing.

(7)

The controller according to any one of (4) to (6), wherein the calculation unit calculates the relative position between the first distance-measuring imaging device and the second distance-measuring imaging device based on a feature point detected from the first subject and a feature point detected from the second subject.

(8)

The controller according to any one of (4) to (7), wherein the calculation unit calculates the relative position between the first distance-measuring imaging device and the second distance-measuring imaging device based on a correspondence relationship between a feature point detected from image data of the first subject imaged by the imaging device for photographing and a feature point detected from image data of the first subject imaged by the first distance-measuring imaging device, and a correspondence relationship between a feature point detected from image data of the second subject imaged by the imaging device for photographing and a feature point detected from image data of the second subject imaged by the second distance-measuring imaging device.

(9)

The controller according to any one of (4) to (8), wherein the calculation unit calculates the relative position between the first distance-measuring imaging device and the second distance-measuring imaging device when the moving body is started.

(10)

The controller according to any one of (4) to (9), wherein the calculation unit calculates the relative position between the first distance-measuring imaging device and the second distance-measuring imaging device when the imaging device for photographing is not imaging landscapes.

(11)

The controller according to any one of (4) to (10), wherein the first subject and the second subject are calibration boards, respectively.

(12)

The controller according to any one of (4) to (11), wherein the first subject and the second subject are people.

(13)

The controller according to any one of (4) to (12), wherein the second subject and the second subject are natural objects or artificial objects.

(14)

The controller according to any one of (4) to (13), wherein the calculation unit calculates the relative position between the first distance-measuring imaging device and the second distance-measuring imaging device based on a vector of a pixel position, which is included in the first subject, and a vector of a pixel position, which is included in the second subject.

(15)

A control method comprising:

acquiring image data captured by an imaging device for photographing disposed in a moving body; and calculating a relative position of a position of a subject, which is detected by a plurality of distance-measuring imaging devices provided in the moving body, based on the subject included in the image data.

(16)

A control program causing a computer to function as:

an acquisition unit that acquires image data captured by an imaging device for photographing disposed in a moving body; and a calculation unit that calculates a relative position of a position of the subject, which is detected by a plurality of distance-measuring imaging devices provided in the moving body, based on the subject included in the image data.

REFERENCE SIGNS LIST

1 UNMANNED FLYING DEVICE
10 IMAGING CAMERA
20-1 FIRST DISTANCE MEASURING CAMERA
20-2 SECOND DISTANCE MEASURING CAMERA
20-3 THIRD DISTANCE MEASURING CAMERA
20-4 FOURTH DISTANCE MEASURING CAMERA
100 CONTROLLER
110 STORAGE UNIT
120 CONTROL UNIT
121 ACQUISITION UNIT
122 IMAGING CONTROL UNIT
123 PROCESSING UNIT
124 EXTRACTION UNIT
125 MATCHING UNIT
126 ESTIMATION UNIT
127 CALCULATION UNIT
130 COMMUNICATION UNIT

The invention claimed is:

1. A controller, comprising:
circuitry configured to:
acquire image data captured by an imaging device in a moving body, wherein the moving body includes a first distance-measuring imaging device and a second distance-measuring imaging device;
calculate a relative position between the first distance-measuring imaging device and the second distance-measuring imaging device based on:
a first subject in a first overlapping area in which a first part of an imaging area of the imaging device overlaps a first distance measuring area of the first distance-measuring imaging device, and
a second subject in a second overlapping area in which a second part of the imaging area overlaps a second distance measuring area of the second distance-measuring imaging device, wherein
the first overlapping area and the second overlapping area are generated at a same time by rotation of the imaging device; and
calculate a position of one of the first subject or the second subject, based on the calculated relative position.

2. The controller according to claim 1, wherein the imaging device is rotatably disposed in the moving body.

3. The controller according to claim 1, wherein the circuitry is further configured to calculate the relative position between the first distance-measuring imaging device and the second distance-measuring imaging device based on a feature point detected from the first subject and a feature point detected from the second subject.

4. The controller according to claim 3, wherein the circuitry is further configured to calculate the relative position between the first distance-measuring imaging device and the second distance-measuring imaging device based on a correspondence relationship between the feature point detected from the image data of the first subject imaged by the imaging device and the feature point detected from distance measured image data of the first subject imaged by the first distance-measuring imaging device, and a correspondence relationship between the feature point detected from the image data of the second subject imaged by the imaging device and the feature point detected from distance measured image data of the second subject imaged by the second distance-measuring imaging device.

5. The controller according to claim 1, wherein the circuitry is further configured to calculate the relative position between the first distance-measuring imaging device and the second distance-measuring imaging device in a case where the moving body is started.

6. The controller according to claim 1, wherein the circuitry is further configured to calculate the relative position between the first distance-measuring imaging device and the second distance-measuring imaging device in a case where the imaging device is not imaging landscapes.

7. The controller according to claim 1, wherein the first subject and the second subject include calibration boards, respectively.

8. The controller according to claim 1, wherein the first subject and the second subject include people.

9. The controller according to claim 1, wherein the first subject and the second subject include one of natural objects or artificial objects.

10. The controller according to claim 1, wherein the circuitry is further configured to calculate the relative position between the first distance-measuring imaging device and the second distance-measuring imaging device based on a vector of a pixel position, which is included in the first subject, and a vector of a pixel position, which is included in the second subject.

11. A control method, comprising:
acquiring image data captured by an imaging device for photographing disposed in a moving body, wherein the moving body includes a first distance-measuring imaging device and a second distance-measuring imaging device;
calculating a relative position between the first distance-measuring imaging device and the second distance-measuring imaging device based on:
a first subject in a first overlapping area in which a first part of an imaging area of the imaging device overlaps a first distance measuring area of the first distance-measuring imaging device, and
a second subject in a second overlapping area in which a second part of the imaging area overlaps a second distance measuring area of the second distance-measuring imaging device, wherein
the first overlapping area and the second overlapping area are generated at a same time by rotation of the imaging device; and
calculating a position of one of the first subject or the second subject, based on the calculated relative position.

12. A non-transitory computer-readable medium having stored thereon, computer-executable instructions which, when executed by a processor, cause the processor to execute operations, the operations comprising control program causing a computer to function as:
acquiring image data captured by an imaging device in a moving body, wherein the moving body includes a first distance-measuring imaging device and a second distance-measuring imaging device;

calculating a relative position between the first distance-measuring imaging device and the second distance-measuring imaging device based on:
  a first subject in a first overlapping area in which a first part of an imaging area of the imaging device overlaps a first distance measuring area of the first distance-measuring imaging device, and
  a second subject in a second overlapping area in which a second part of the imaging area overlaps a second distance measuring area of the second distance-measuring imaging device, wherein
  the first overlapping area and the second overlapping area are generated at a same time by rotation of the imaging device; and
calculating a position of one of the first subject or the second subject, based on the calculated relative position.

\* \* \* \* \*